US005650679A

United States Patent [19]
Boggs, III et al.

[11] Patent Number: 5,650,679
[45] Date of Patent: Jul. 22, 1997

[54] EDDY CURRENT DRIVE

[76] Inventors: Paul Dewey Boggs, III, 8265 Lupine Cir., Fort Worth, Tex. 76135; Timothy J. Boggs, 6905 Wayfarer Trail., Fort Worth, Tex. 76137

[21] Appl. No.: 498,968

[22] Filed: Jul. 6, 1995

Related U.S. Application Data

[63] Continuation-in-part of Ser. No. 366,629, Dec. 30, 1994, Pat. No. 5,627,422, which is a continuation-in-part of Ser. No. 179,485, Jan. 7, 1994, Pat. No. 5,446,327, which is a continuation-in-part of Ser. No. 56,132, Apr. 30, 1993, Pat. No. 5,434,461, which is a continuation-in-part of Ser. No. 35,981, Mar. 18, 1993, Pat. No. 5,465,108.

[51] Int. Cl.$^6$ .............. H02K 49/02; H02K 5/16; H02K 49/00; H02K 1/00
[52] U.S. Cl. .............. 310/105; 310/90; 310/95; 310/181
[58] Field of Search .............. 310/93, 95, 103, 310/104, 105, 90, 181

[56] References Cited

U.S. PATENT DOCUMENTS

| | | | |
|---|---|---|---|
| Re. 25,516 | 1/1964 | Jaeschke . | |
| 1,093,149 | 7/1914 | Schneider . | |
| 1,164,262 | 12/1915 | Creveling | 310/230 |
| 1,638,890 | 8/1927 | Staege | 477/12 |
| 1,855,281 | 7/1932 | Chilton | 290/38 B |
| 2,365,691 | 12/1944 | Fodor | 242/75 |
| 2,447,130 | 8/1948 | Matulaitis et al. | 310/95 |
| 2,449,779 | 9/1948 | Jaeschke | 310/95 |
| 2,489,184 | 11/1949 | Jaeschke et al. | 310/105 |
| 2,521,574 | 9/1950 | Findley | 310/105 |
| 2,594,931 | 4/1952 | Jaeschke | 310/105 |
| 2,606,948 | 8/1952 | Jaeschke | 172/284 |
| 2,616,069 | 10/1952 | Jaeschke | 318/492 |
| 2,630,466 | 3/1953 | Landis | 310/93 |
| 2,630,467 | 3/1953 | Winther | 172/284 |
| 2,657,323 | 10/1953 | Jaeschke | 310/95 |
| 2,659,020 | 8/1953 | Brown | 310/95 |

(List continued on next page.)

OTHER PUBLICATIONS

Industrial Electric Reels, Inc., Series SU 360° Swivel Unit brochure with prices 1956.
Eaton Ajusto–Spede Eddy–Current® Drives Data Catalog, 1979.
*ABC of Adjustable Speed With Ampli–Speed Magnetic Drive, E–M Sychronizer,* Speical Issue 200–SYN–64, Electric Machinery Mfg., pp. 1, 6, 7, last page.
*EM Ampli–Speed Magnetic Drive Horizontal and Vertical,* McGraw–Edison, Electric Machinery brochure 5100–PRD–312A, Sep. 1981.
*EM Ampli–Speed Magnetic Drive Horizontal,* Dresser–Rand, Electric Machinery brochure 5200–PRD–315A, Sep. 1981.
MPS Modern Production Systems, Inc. product brochure 1989.
*EM Ampli–Speed Magnetic Drive Vertical,* Dresser–Rand, Electric Machinery brochure 5200–PRD–313A, Sep. 1981.
*MCRT Non–Contact Strain Gage Torquemeters,* S. Himmelstein and Company, Bulletin 761, 1976.
Fabricast, Inc. Standard Catalog Slip Ring Assemblies, 1967.
Graphite Metallizing Corporation, brochure, 1967.

*Primary Examiner*—Steven L. Stephan
*Assistant Examiner*—Michael Wallace, Jr.
*Attorney, Agent, or Firm*—Geoffrey A. Mantooth

[57] ABSTRACT

An eddy current drive has an electromagnet and an armature. Either one of the electromagnet or the armature is coupled to a motor shaft so as to rotate therewith, while the other is coupled to a load portion. The motor can rotate at a continuous speed, while the speed of the load portion can vary by varying the energization of the electromagnet, so as to vary the coupling between the electromagnet and the armature. The electromagnet is energized by way of bearings. The bearings provide a rotary coupling. In another embodiment, an electrical generator is provided. The rotation of the motor shaft generates electrical current that is used to energize the electromagnet. The amount of the electrical current that is provided to the electromagnet can be varied to vary the output speed of the load portion.

22 Claims, 27 Drawing Sheets

U.S. PATENT DOCUMENTS

| | | | |
|---|---|---|---|
| 2,676,280 | 4/1954 | Jaeschke | 310/95 |
| 2,679,604 | 5/1954 | Jaeschke | 310/101 |
| 2,741,437 | 11/1956 | Haworth | 242/413.5 |
| 2,872,606 | 3/1959 | Brill | 310/239 |
| 2,920,221 | 4/1960 | Schwab | 310/96 |
| 2,939,974 | 10/1960 | Knight | 310/95 |
| 2,945,104 | 1/1960 | Jaeschke | 192/84 R |
| 2,957,562 | 9/1960 | Rudisch | 192/84 R |
| 3,007,066 | 8/1961 | Ponsy | 310/96 |
| 3,028,737 | 7/1962 | Rudisch | 64/30 |
| 3,056,895 | 12/1962 | Cohen et al. | 310/96 |
| 3,178,598 | 4/1965 | Cohen et al. | 310/98 |
| 3,214,618 | 10/1965 | Jaeschke | 310/90 |
| 3,229,132 | 1/1966 | Cohen et al. | 310/105 |
| 3,229,796 | 1/1966 | Worst | 192/104 R |
| 3,233,131 | 2/1966 | Stegman | 310/105 |
| 3,294,995 | 12/1966 | Edick | 310/95 |
| 3,303,367 | 2/1967 | Jaeschke et al. | 310/95 |
| 3,394,278 | 7/1968 | Schetinin | 310/105 |
| 3,421,784 | 1/1969 | Paterson | 192/84 R |
| 3,423,615 | 1/1969 | Patton | 310/105 |
| 3,423,616 | 1/1969 | Jacobs | 310/105 |
| 3,463,285 | 8/1969 | Sisler | 192/104 R |
| 3,478,239 | 11/1969 | Jaeschke | 310/105 |
| 3,486,052 | 12/1969 | Jaeschke | 310/105 |
| 3,518,472 | 6/1970 | O'Callaghan | 310/95 |
| 3,525,891 | 8/1970 | Lukawich et al. | 310/23 |
| 3,539,850 | 11/1970 | Sato | 310/68 |
| 3,549,921 | 12/1970 | Halstead | 310/105 |
| 3,566,168 | 2/1971 | Matsubara | 310/105 |
| 3,581,267 | 5/1971 | Schreffler | 339/8 |
| 3,584,248 | 6/1971 | Higashino et al. | 310/68 |
| 3,587,798 | 6/1971 | Schuman | 192/120 |
| 3,601,641 | 8/1971 | Baermann | 310/93 |
| 3,601,643 | 8/1971 | Krulls | 310/105 |
| 3,619,681 | 11/1971 | Ginkel et al. | 310/232 |
| 3,652,886 | 3/1972 | Riordan et al. | 310/168 |
| 3,662,197 | 5/1972 | Worst | 310/78 |
| 3,670,189 | 6/1972 | Monroe | 310/46 |
| 3,716,788 | 2/1973 | Nishida | 324/174 |
| 3,735,167 | 5/1973 | Wickersheimer | 310/168 |
| 3,742,270 | 6/1973 | Jaeschke | 310/105 |
| 3,745,393 | 7/1973 | Spors | 310/239 |
| 3,769,533 | 10/1973 | Pauwels | 310/155 |
| 3,769,534 | 10/1973 | Wroblewski | 310/168 |
| 3,784,852 | 1/1974 | Noly | 310/105 |
| 3,838,323 | 9/1974 | Anderson | 318/302 |
| 3,870,914 | 3/1975 | Walker | 310/219 |
| 3,916,235 | 10/1975 | Massar | 310/219 |
| 3,924,585 | 12/1975 | Woods | 123/41.12 |
| 3,974,408 | 8/1976 | Fehr et al. | 310/103 |
| 3,996,485 | 12/1976 | Jaeschke | 310/103 |
| 4,033,202 | 7/1977 | Ahlen et al. | 477/131 |
| 4,040,508 | 8/1977 | Sunada et al. | 192/12 D |
| 4,043,621 | 8/1977 | Heinz | 384/510 |
| 4,090,592 | 5/1978 | Jovick et al. | 188/181 |
| 4,110,647 | 8/1978 | Eslinger et al. | 310/168 |
| 4,159,433 | 6/1979 | Takayama et al. | 310/168 |
| 4,171,495 | 10/1979 | McNinch, Jr. | 310/155 |
| 4,171,496 | 10/1979 | Ericksson | 310/219 |
| 4,172,987 | 10/1979 | Massar | 310/178 |
| 4,203,046 | 5/1980 | Homann et al. | 310/93 |
| 4,209,213 | 6/1980 | Wussow | 339/5 |
| 4,209,214 | 6/1980 | Martinez | 439/22 |
| 4,227,861 | 10/1980 | LaFlame | 416/169 |
| 4,355,709 | 10/1982 | Light | 192/58 |
| 4,358,695 | 11/1982 | MacDonald et al. | 310/105 |
| 4,379,242 | 4/1983 | MacDonald et al. | 310/105 |
| 4,400,638 | 8/1983 | Albrecht et al. | 310/95 |
| 4,410,819 | 10/1983 | Kogayashi et al. | 310/105 |
| 4,446,392 | 5/1984 | Jaeschke . | |
| 4,526,257 | 7/1985 | Mueller | 191/48.2 |
| 4,686,399 | 8/1987 | Imori et al. | 310/62 |
| 4,734,603 | 3/1988 | VonderHeide et al. | 310/72 |
| 4,864,173 | 9/1989 | Even | 310/93 |
| 4,885,489 | 12/1989 | Stuhr | 310/78 |
| 4,924,128 | 5/1990 | Vaillant De Guelis et al. | 310/156 |
| 4,949,022 | 8/1990 | Lipman | 318/254 |
| 5,053,656 | 10/1991 | Hodge | 310/42 |
| 5,139,425 | 8/1992 | Daviet et al. | 439/17 |
| 5,260,642 | 11/1993 | Huss | 322/51 |
| 5,337,862 | 8/1994 | Kuwabara | 188/158 |
| 5,363,912 | 11/1994 | Wolcott | 166/72 |
| 5,523,638 | 6/1996 | Albrecht et al. | 310/219 |

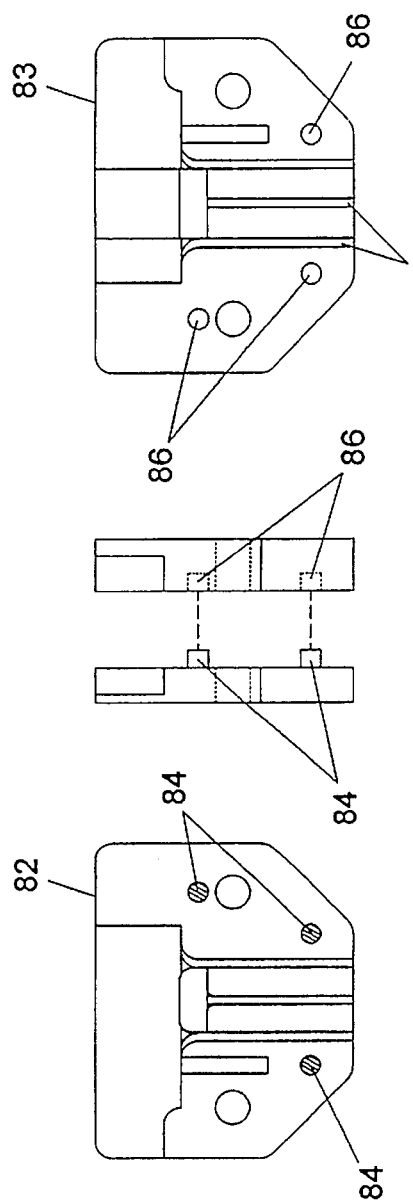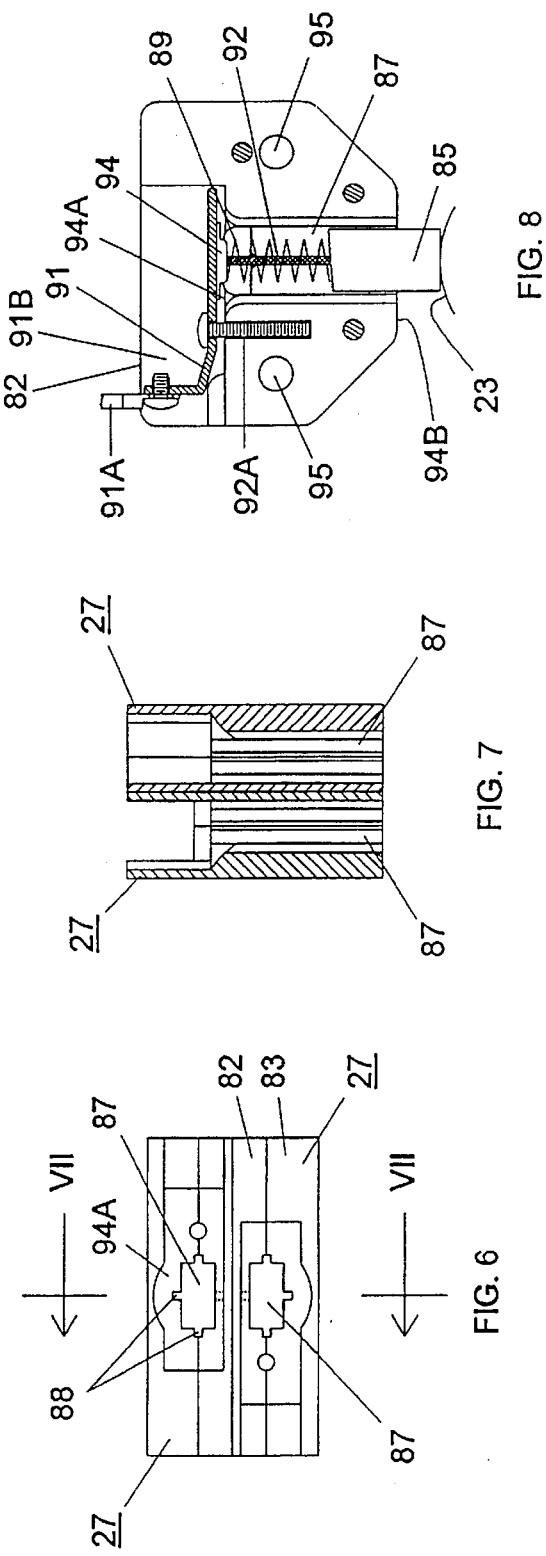

EDDY CURRENT DRIVE

This application is a continuation in part of U.S. application Ser. No. 08/366,629, filed Dec. 30, 1994, now U.S. Pat. No. 5,627,422, which is a continuation-in-part of U.S. application Ser. No. 08/179,485, filed Jan. 7, 1994, now U.S. Pat. No. 5,446,327, issued Aug. 29, 1995, which application is a continuation-in-part of U.S. application Ser. No. 08/056,132, now U.S. Pat. No. 5,434,461, issued Jul. 18, 1995, filed Apr. 30, 1993, which application is a continuation-in-part of U.S. application Ser. No. 08/035,981, filed Mar. 18, 1993, now U.S. Pat. No. 5,465,108, issued Nov. 7, 1995.

FIELD OF THE INVENTION

The present invention relates to variable speed drives that are coupled to an output shaft of a motor, such as a fixed speed electric motor, and in particular the present invention relates to eddy current drives.

BACKGROUND OF THE INVENTION

There are many applications where it is desirable to have a fixed speed motor provide a variable speed output. For example, in ventilation systems, an ac synchronous motor is used to rotate an air mover, such as a fan. The energy efficiency of this system increases if the speed of the motor remains fixed while the speed delivered to the fan can be varied.

In the prior art, there are variable speed drives that couple to the output shaft of the motor. Around the outer circumference of the drive are one or more sheaves. The sheaves receive belts that are coupled to a load. The drive permits a controlled amount of slip. At zero slip, the full rotary power of the motor output shaft is applied to rotate the sheaves. At full slip, the motor output shaft continues to rotate, but the sheaves remain stationary under a load. Thus, at zero slip, the full rotary power of the motor is applied to the load, while at full slip, no rotary power is applied to the load.

One such type of variable speed drive is an eddy current drive. The amount of slip is controlled electrically using eddy currents. The output sheaves are mechanically coupled to poles of an electric coil. There are provided opposite, interdigitated poles. An armature provides a magnetic path between the opposite poles. The armature is mechanically coupled to the output shaft of the electric motor. As the motor shaft rotates, the armature also rotates at the same speed as the shaft. In order to rotate the sheaves, current is applied to the coil. This creates an electromagnetic coupling between the poles and the armature, wherein the armature causes the poles and the associated sheaves to rotate. One such prior art drive is disclosed in Albrecht et al., U.S. Pat. No. 4,400,638.

The electric coil is energized by an external power supply. That is to say that the power supply is not on the variable speed drive itself, but is located off of the drive. The power supply is stationary with regard to the rotating coil. Thus, some mechanism is needed to electrically connect the stationary power supply to the rotating coil. This electrical connection is commonly accomplished using brushes and slip rings, wherein the brushes are held stationary and the slip rings rotate with the coil.

It is desired to improve upon the prior art drives. The slip rings of the Albrecht et al. drive have the same diameter as, and are located adjacent to, the sheaves. One disadvantage of the slip ring arrangement is the wear on brushes. The chief complaint among customers who buy the prior art drives is brush wear. The brushes must be frequently replaced, adding to the maintenance cost of the drives. The larger the circumference of the slip rings, the shorter the life of the brushes becomes because for each revolution of the motor, the brushes are in frictional contact with a long length of the slip rings. Another disadvantage of the slip ring arrangement of Albrecht et al. is that as the drive is sized larger or smaller for respective larger or smaller load applications, the circumference of the slip rings change. Thus, the slip rings must be custom made for each size drive. It is desirable to make the slip rings a more uniform size, regardless of the size of the drive, in order to manufacture and repair the drives more efficiently.

Still another disadvantage of the slip ring arrangement of Albrecht et al. is the difficulty in protecting the slip rings and brushes from the environment. If the drive is used outside, it is subjected to moisture, which can reduce the life of the brushes.

A further disadvantage of the slip ring arrangement of Albrecht et al. is that brushes are required to provide current to the rotating coil. As noted above, brushes are subject to wear and must be frequently replaced. It is desirable to provide a means of supplying current to the coil less subject to wear and requiring less maintenance than brushes.

Referring now to prior eddy current drives in general, a disadvantage is that these drives require external power supplies. However, there are applications where external power supplies are either unfeasible or uneconomical. For example, in geographical locations (such as at an oil well) that are remote from an electrical power grid, the cost of extending a connection to the power grid may be prohibitive.

Even in applications where a power grid or other power source is close by, the installation of a variable speed drive can be expensive and time consuming. This is because typically an electrician must be hired and scheduled to make the electrical connections between the power supply and the variable speed drive. It may take several days to several weeks before the electrician is able to schedule the installation. In the mean time, the variable speed drive is unusable.

This continuation-in-part application discloses for the first time FIGS. 29–33.

SUMMARY OF THE INVENTION

It is an object of the present invention to provide a shaft mounted eddy current drive that has a self contained power supply.

Still another object of the present invention is to provide a brushless drive.

In one aspect of the present invention, the rotating coil in the electromagnet is provided with current directly through at least one bearing. The bearing has first and second portions, with the first portion being electrically connected to the drive coil, the second portion being electrically connected to a stationary wire and the first and second portions being electrically connected together.

By using bearings to energize a drive coil, the need for brushes is eliminated. In addition, to providing a power coupling, the bearing can provide structural support to a speed sensor.

The bearings are mounted to a shaft that is located at one end of the hub. The other end of the hub receives the motor shaft. Thus, the bearings can be sized small because they need not receive the motor shaft. In addition, the shaft can be an output shaft.

In another aspect of the present invention, the variable speed drive is for use with a motor, with the motor having a motor shaft. The drive includes an electromagnet having a coil. An armature is located close to the electromagnet. One of the electromagnet or the armature is structured and arranged so as to be coupled with the motor shaft so as to rotate in unison with the motor shaft. The other of the electromagnet or the armature is structured and arranged so as to rotate independently of the motor shaft and is directly coupled to a load portion. A generator has a rotor and a stator. The rotor is structured and arranged to be coupled to the motor shaft and the stator structured to be coupled to a nonrotating point relative the motor shaft. One of the rotor or the stator produces a magnetic field and the other of the rotor or the stator has a winding that is located within the magnetic field. The other of the rotor or the stator that has the winding has an electrical output. There is an energy regulator having an input that is connected to the electrical output of the generator. The regulator has an output that is connected to the coil.

In accordance with one aspect of the present invention, the generator is an ac generator. The drive has a rectifier that has an input that is coupled to the electrical output of the generator. The rectifier has an output that is coupled to the input of the regulator.

In accordance with still another aspect of the present invention, the one of the rotor or the stator that provides a magnetic field includes permanent magnets.

In accordance with still another aspect of the present invention, the winding is located on the rotor. Alternatively, the winding can be located on the stator, wherein the drive further includes an electrical rotary coupling connected between the winding and the coil. If an electrical rotary coupling is used, the coupling can take various forms. For example, the electrical rotary coupling can include a liquid coupling or bearings.

In accordance with still another aspect of the present invention, the input of the regulator has a power input. The regulator further includes a speed input which provides a variable speed signal to the regulator. The speed signal can be provided to the speed input by way of a wireless channel, a fiber optic channel, or other types of channels. The regulator further includes a feedback input that is connected to a speed sensor, wherein the speed sensor is located adjacent to the other of the electromagnet or the armature that is directly coupled to the load portion. There is also a comparator having first and second inputs, with the first input being connected to the speed input and the second input being connected to the feedback input.

In accordance with still another aspect of the present invention, the regulator includes means for moving either one of the stator or the rotor with respect to the other of the stator of the rotor so as to vary the amount of the magnetic field that is provided to the winding.

There is also provided a method of operating a variable speed drive. The drive includes a first rotatable member with an electromagnet and a second rotatable member with an armature that is located close to the electromagnet. One of either the first rotatable member or the second rotatable member is coupled to a motor shaft. The other of the first rotatable member or the second rotatable member is coupled to a load portion. The method includes rotating the one of the first rotatable member or the second rotatable member that is coupled to the motor shaft by the motor. Electrical energy is generated from the rotation of one of the first rotatable member or the second rotatable member that is coupled to the motor shaft. The generated electrical energy is provided to the electromagnet.

In accordance with one aspect of the method of the present invention, the amount of generated electrical energy that is provided to the electromagnet is regulated so as to vary an output speed of the load portion.

In accordance with still another embodiment of the method of the present invention, a rotor is provided, which rotor is coupled to the one of the first rotatable member or the second rotatable member that is rotated by the motor. A stator is provided adjacent to the rotor and is coupled to the other of the first rotatable member or the second rotatable member, wherein one of either the rotor or the stator creates a magnetic field and the other of either the rotor of the stator has a winding that is electrically coupled to the electromagnet and that is exposed to the magnetic field. Electrical energy is generated by rotating the rotor.

In still another aspect of the present invention, the amount of generated electrical energy that is provided to the electromagnet is regulated by varying the mount of the magnetic field that is provided to the winding.

The present invention utilizes the rotational energy of the motor shaft to regulate the output speed of the load portion of the drive. Eddy current drives are typically provided so as to provide a regulated output speed that is different than the output speed of the motor. This allows the motor to rotate at a constant speed. To vary the output speed of the drive, the drive coil is energized more (to increase the output speed of the drive) or less (to decrease the output speed of the drive).

By providing a generator in combination with drive, electrical energy is generated. This energy is then provided to the electromagnet coil of the drive. By varying the amount of electrical energy that is generated, or by varying the mount of electrical energy that is provided to the coil, the output speed of the drive can be varied.

The drive is self contained by virtue of the fact that it has its own power supply. This greatly simplifies the installation of the drive. In addition, the drive is useful for applications in remote areas because it does have a self contained power supply for the coil. If any electronic regulator is used, a low voltage power supply could be provided. Alternatively, low voltage power to operate an electronic regulator could be generated by way of the generator.

BRIEF DESCRIPTION OF THE DRAWINGS

FIGS. 3–8 are views of a brush holder that is used in conjunction with the drive of FIG. 1.

FIGS. 3 and 5 are side views showing the interiors of the first and second portions, respectively, of a brush holder, in accordance with a preferred embodiment.

FIG. 4 is an end view showing how the first and second portions of the brush holder fit together.

FIG. 6 is a top plan view of the brush holders.

FIG. 7 is a cross-sectional view taken along lines VII—VII of FIG. 6.

FIG. 8 is a side view of the first portion of a brush holder, with a brush installed, and the second portion removed for clarity.

DESCRIPTION OF THE PREFERRED EMBODIMENT

Figure 1:
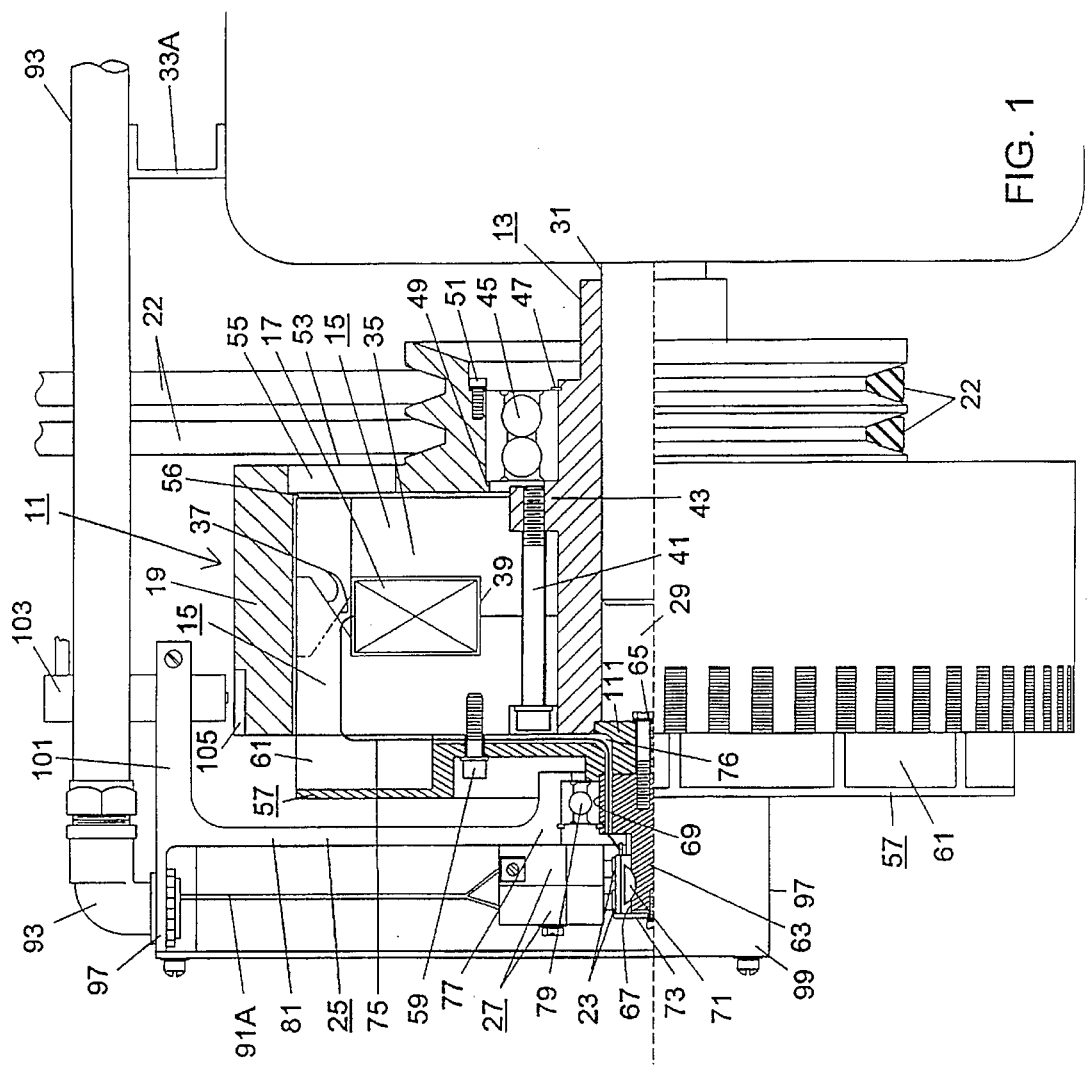
FIG. 1 is a partial cross-sectional side view of the shaft mounted eddy current drive, in accordance with a preferred embodiment.

In FIG. 1, there is shown a partial cross-sectional side view of the drive 11, in accordance with a preferred embodiment. The drive 11 has a shaft mounted portion and a load portion. The shaft mounted portion includes a hub 13, pole pieces 15 and a coil 17. The shaft mounted portion mounts onto the shaft of a motor and is rotated directly by the motor shaft. The load portion is rotated by an electromagnetic field developed by the shaft mounted portion. The load portion is coupled to the load (e.g. a fan) and includes an armature 19 and sheaves 21. In addition, the drive includes slip rings 23, a brush holder bracket 25 and brush holders 27.

The shaft mounted portion will now be described. The hub 13 is generally in the form of a sleeve. The hub 13 has a cylindrical cavity 29 located therein for receiving a shaft 31 of a motor 33. The hub 13 is coupled to the shaft 31 by a conventional and commercially available compression type shrink disk (not shown). Alternatively, the cavity 29 may be keyed or threaded to receive respective keys or threads on the motor shaft. The hub 13 has an outer end portion and an inner end portion (with inner being referenced as closer to the motor and outer being referenced as further from the motor 33).

Mounted on the outer end portion of the hub are the pole pieces 15. There are two pole pieces, an inner piece and an outer piece. Each pole piece 15 is made up of an annular portion 35, with poles 37 extending from the outer diameter of the annular portion and a lip 39 extending from the inner diameter of the annular portion. The poles 37 on an individual pole piece are spaced apart by gaps. When the pole pieces are assembled as shown, the poles from the inner and outer pole pieces are interdigitated so as to form alternating polarities around the circumference of the assembly of pole pieces. The assembled pole pieces 15 encircle the coil 17 of wire. Thus, the coil 17 is encircled by the annular portions 35, lips 39 and poles 37 of the pole pieces. The pole pieces and the coil extend around the circumference of the hub. The pole pieces 15, and thus the encircled coils, are secured to the hub 13 by bolts 41. The hub 13 has a circumferential shoulder 43 that extends radially outward to receive the bolts and to position the pole pieces 15. The pole pieces abut against the shoulder 43. The pole pieces are made from a low carbon steel, which is magnetic, so as to provide a path for a magnetic field.

The load portion will now be described. The sheaves 21 are mounted to the hub 13 by way of bearings 45. In the preferred embodiment, the bearing 45 is a double row ball bearing. Alternatively, the bearing may be two bearings. The bearings 45 are located on the hub between the shoulder 43 and a snap ring 47 that is on the hub. The bearings 45 extend around the circumference of the hub. The sheaves 21 are located around the outer circumference of the bearings. The sheaves 21 are positioned on the bearings by a shoulder 49 on one end and bolts 51 on the other end. The sheaves receive belts 22, which are rotatably coupled to a load such as a fan.

The armature 19 is coupled to the sheaves by a radially extending wall 53. The armature 19 is a hollow cylinder and is made of a material that is high in conductivity and permeability. The wall has openings 55 therethrough that communicate with a cavity 56 formed by the armature 19 and the wall 53. The cavity 56 receives the pole pieces 15. The openings 55 allow air circulation through the pole pieces. The sheaves 21, armature 19 and wall 53 form an integral assembly. Alternatively, an interior sleeve can be press fit into the inside diameter of the armature. The interior sleeve can be made of a material that is suitable for the production of eddy currents (high conductivity, high permeability) while the armature around the sleeve can be designed to dissipate heat.

The slip rings 23 are secured to the pole pieces 15 by way of a fan 57. The fan 57 is located so that the pole pieces 15 are interposed between the fan 57 and the sheaves 21. Bolts 59 secure the fan 57 to the outer pole piece 15. The fan has openings 61 therein so that as the pole pieces rotate, the fan causes air to circulate through the openings 55, 61 and the pole pieces for cooling.

A slip ring shaft 63 is coupled to the fan 57 by bolts 65. The slip ring shaft 63 extends in an axial direction away from the sheaves 21. The slip ring shaft has first and second outer surfaces 67, 69. The first outer surface 67 is located at the outer end of the slip ring shaft. The slip rings 23 are mounted on the first surface 67 with a key 71 and an end plate 73. The end plate 73 is bolted onto the outer end of the slip ring shaft. The slip rings 23 extend around the circumference of the slip ring shaft. Wires 75 connect the slip rings 23 to the coil 17. The wires 75 extend through passageways 76 drilled or otherwise formed in the slip ring shaft 63 and the fan 57.

The brush holder bracket 25 has a sleeve portion 77 that is mounted around the second surface 69 of the slip ring shaft 63 by way of a bearing 79. The bearing 79 is secured in place against a shoulder on the fan 57 and snap rings. The bracket 25 has a radial extension portion 81 that extends past the armature 19.

The brush holders 27 are coupled to the radial extension portion 81 of the brush holder bracket 25. Referring to FIGS. 3-8, there are two brush holders 27, one for each brush 85. Each brush holder 27 has a first portion 82 (shown in FIG. 3) and a second portion 83 (shown in FIG. 5). The first portion 82 is provided with pins 84 on its interior surface, while the second portion 83 is provided with holes 86 for receiving the pins 84. The two portions 82, 83 snap fit together with the pins 84 inserted into the holes 86 (see FIG. 4). Each portion has a groove located therein. When the portions are assembled, the groove forms a generally rectangularly shaped cavity 87 for receiving the carbon brushes 85 (see FIGS. 6 and 8). Each side wall of the cavity 87 has a shallow groove 88 that allows the brushes to move inside the cavity.

Each brush 85 is connected to a contact 94 by a flexible wire 92. A spring 89 is interposed between the brush 85 and the contact 94. The contact 94 has edges that bear on a top surface 94A of the assembled brush holder 27. Thus, the brush 85 is prevented from being pulled out from the bottom 94B of the brush holder. A clip 91 overlies the contact 94. The clip is L-shaped to provide a connection point for a wire 91A. The wires 91A connected to the clips are routed to an external power source by a conduit 93. The clip 91 is secured to the brush holder by a screw 92A. The clip is located inside of a recess 91B on the top of the brush holder. This recess 91B locates the clip 91, and the connection point with the wire 91A entirely within the protective confines of the brush holder. The contact 94 makes electrical contact with the clip 91.

Figure 2:
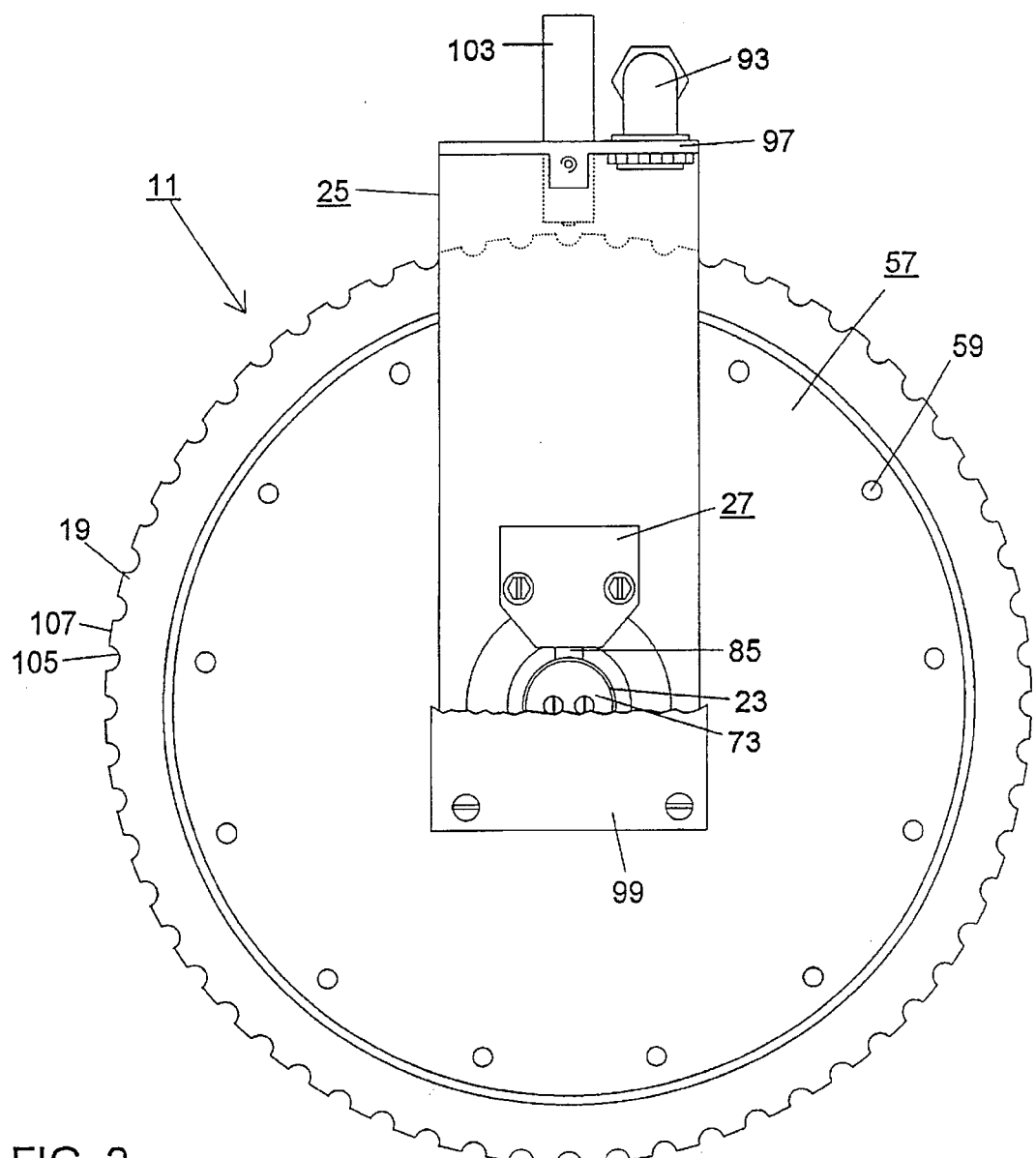
FIG. 2 is a view showing the outer end of the drive of FIG. 1, with a housing around the slip rings and brush holder partially cut away.

The two brush holders 27 are oriented with respect to each other as shown in FIG. 6, so that the clips, when installed, face opposite directions. This simplifies the wire connections with the clips. The brush holders are bolted to the brush holder bracket by bolts that are received by holes 95. Referring to FIG. 2, the brush holders 27 are located close to the slip rings 23 so that the brushes 85, which protrude out of the cavities, can contact the slip rings.

The brush holder bracket 25 has end walls 97 that extend in an axial direction. The end walls receive a housing 99 or cover, a portion of which has been broken away in FIGS. 1 and 2 to more clearly illustrate the slip rings and brush holders. The housing 99 and the bracket 25 completely encase the slip rings 23 and the brush holders 27 so as to protect the slip rings and brush holders from the environment and moisture, thereby extending the life of the brushes. Screws are used to couple the housing to the bracket 25. The housing is removable to allow access to the slip rings and brush holders.

The brush holder bracket 25 has an extension 101 (see FIG. 1) that is used to position a speed sensor 103 adjacent to the rotating armature. The outer surface of the armature 19 is scored at regular intervals (see FIG. 2). In the preferred embodiment, the scoring takes the form of grooves 105 which form peaks 107. The sensor 103 is a magnetic pulse pickup. Thus, as the steel armature 19 rotates, every peak 107 is counted. Conventional control circuitry, not shown, is used to monitor the signal produced by the sensor and to control the mount of current supplied to the brush in order to control the speed of the armature rotation.

The drive need not be supplied with a speed sensor. Many applications already have control systems. For example, in HVAC, inputs of temperature and pressure are used to control the speed of the armature rotation.

The assembly of the drive will now be described, referring to FIG. 1. The bearings 45 are installed and secured onto the hub 13. Then, the armature and sheave assembly 19, 21 are installed and secured onto the bearings 45. The pole pieces 15 and coil 17 are assembled together to make up an annular electromagnet. The pole pieces 15 and coil 17 are installed onto the hub 13 with the pole pieces in abutting relationship with the shoulder 43. The pole pieces are then bolted 41 in place. The fan 57 and the slip ring shaft 63 are bolted 65 together. The fan assembly is bolted 59 to the pole pieces. The center 111 of the fan is disk shaped and received by the hub cavity 29 to center the fan with respect to the pole pieces. The support bracket 25 is then mounted, by way of bearings 79, to the slip ring shaft. Then, the brush holders 27 and speed sensor 103 are coupled to the bracket 25.

The drive 11 is then installed onto a motor shaft 31. The motor shaft 31 is inserted into the hub cavity 29 and a compression disk is used to firmly secure the hub to the shaft. The cover 99 is installed onto the bracket 25.

The conduit 93, which contains the wires connected to the brushes, is anchored to a fixed platform, such as the motor 33. A bracket 33A is used to couple the conduit 93 to the motor 33. The wires from the speed sensor 103 are typically tie wrapped to the outside of the conduit 93.

In the preferred embodiment, the conduit 93 is positioned between the sheaves 21 and the load. Thus, when the belts are installed on the sheaves, the conduit 93 extends through the loops formed by the belts; that is the belts 22 extend around both the sheaves 21 and the conduit 93. This arrangement of the conduit 93 through the belts 22, together with the arrangement of the slip rings and the bracket on the outer end of the drive, away from the sheaves, allows the belts to be installed and removed from the sheaves and the load, without disconnecting the conduit and without removing the bracket 25 and the brush holders 27. Thus, the belts can be quickly installed or removed without disturbing the drive, thereby reducing maintenance and down times.

The sheaves 21 are fully supported by the bearings 45, thereby providing long operational life of the sheaves and bearings 45. In addition, the sheaves and the bulk of the mass (the electromagnet) are located close to the motor 33. This arrangement reduces the overhung load on the motor shaft.

The operation of the drive 11 will now be described. The motor 33 is started and the shaft 31 is rotated. As the shaft rotates, it rotates the pole pieces 15 and the coil 17. The sheaves 21 do not rotate, as they are held stationary by the load.

To rotate the sheaves, a selected mount of current is provided to the coil, by way of the brushes and slip rings. This energizes the coil, which causes an electromagnetic field to be developed between adjacent poles. The armature becomes electromagnetically coupled to the pole pieces, wherein the armature and the sheaves are rotated. If the electromagnetic field is weak, then there will be some slip between the armature and the pole pieces. Thus, for every revolution of the pole pieces, the armature will rotate less than one revolution. By controlling the strength of the energizing current to the coil, the amount of slippage and the speed of the armature can be controlled.

The drive 11 may be partially disassembled for maintenance and inspection purposes without uncoupling the drive from the load. Thus, the belts may be retained on the sheaves 21 during partial disassembly. To partially disassemble the drive 11, the bolts 59 are removed, thereby allowing the fan 57, slip ring shaft 63 and bracket 25 to be removed from the pole pieces 15. Then, the bolts 41 are removed, thereby allowing the pole pieces 15 and coil 17 to be removed from the interior cavity 56 of the armature 19. The electromagnet (the pole pieces and the coil) and the slip ring arrangement can be worked on and then reinstalled. During the partial disassembly of the drive, the hub 13 and armature-sheave assembly 19, 21 remain coupled to the motor shaft and to the load. Thus, the design of the drive simplifies maintenance and inspection procedures.

Replacing the brushes 85 is also simple. One method involves removing the clip 91 (see FIG. 8). The contact 94 and brush 85 are then removed and replaced, and the clip 91 is reinstalled. Thus, the brush holders 27 remain coupled to the bracket 25. Another method of changing the brushes involves removing and disassembling the brush holders 27 into their first and second portions 82, 83. This procedure allows the brush holders to be cleaned of carbon dust. After cleaning, the brush holders are reassembled and new brushes are installed.

Replacement of the slip rings 23 is also simplified, requiring only removal of the end plate 73, slipping the slip rings off of the shaft 63 and reinstalling a new pair. Replacement of the brushes and slip rings can be performed while leaving the drive intact on the motor shaft 31.

The drive of the present invention has several advantages over prior art drives. One advantage is due to the design of the slip rings. The slip rings are located at the outer end of the drive and are of relatively small diameter. In the preferred embodiment, a slip ring shaft provides a support for mounting the slip rings. The small diameter of the slip rings greatly prolongs brush life by presenting a relatively small circumference that the brushes must traverse for each revolution of the slip rings. Because the brushes contact shorter lengths of slip rings per revolution, the lives of the brushes are prolonged.

Also, by providing the slip rings on a separate slip ring shaft, the size of the slip rings is independent of the sizes of the motor shall, the sheave and the drive in general. Thus, as the design of the drive is enlarged to provide a drive with more horsepower, or reduced to provide a drive with less horsepower, the size of the slip rings, and thus the brush holders, can remain the same. This uniformity in size of slip rings, which is independent of the size of the drive, reduces manufacturing costs while allowing flexibility in producing a product line of plural drives, each of which is designed for a specific horsepower. Inventory costs are reduced as well, because both manufacturer and user need only stock one size of slip rings and brush holders.

The drive also provides a housing or cover for containing and protecting the slip rings and brushes from the elements. This is important for drives that are used outside, as brush life is extended. The cover prevents moisture from contacting the brushes and the slip rings.

The design of the drive allows for easy partial disassembly while maintaining the connection of the drive to the load and to the motor shaft. The brush holders, slip rings, fan and electromagnet can be removed while leaving the hub connected to the motor shaft and the sheaves coupled to the load. This reduces maintenance time because the drive does not have to be completely removed during disassembly.

The drive is more stable in operation because the sheaves are fully mounted on bearings and are located closer to the end of the hub that couples to the end of the motor. Prior art drives mount the brush holder bracket on the same end of the hub as the sheaves. This causes the sheaves to either be mounted further from the motor (which unfavorably loads the motor shaft and produces vibration) or to be only partially mounted onto a bearing (which produces unbalancing and vibration of the sheaves). The drive of the present invention does not suffer these prior art problems because the sheaves are fully supported by the bearings. In addition, the sheaves, as well as the bulk of the mass of the driver, are located closer to the motor than the prior art drives. This drastically reduces the overhung load on the motor shaft, prolonging motor life.

Another advantage of the drive of the present invention is that the sheaves are fully exposed at all times. In the prior art, the brush holder bracket extends across the sheaves. With the drive of the present invention, the slip rings and brush holder bracket are located on the opposite end of the drive from the sheaves. Thus, the belts can be installed onto and removed from the sheaves without removing the brush holder bracket. In addition, a conduit is used to prevent rotation of the brush holder bracket. The conduit is anchored to the motor and extends through the belts. This arrangement allows the belts to be installed and removed without disassembling any part of the drive.

Still another advantage of the drive is the coupling of the electromagnet to the hub and the fan to the electromagnet. The motor shaft rotates the hub, the electromagnet and the fan continuously at motor speed. This continuous movement of the electromagnet and the fan produces continuous cooling of the electromagnet. Prior art drives locate the electromagnet on the driven member, which may be stationary or operating at a low speed. The electromagnet on prior art drives is not cooled as effectively as with the present invention due to the reduced rotational speed. Effective cooling of the electromagnet prolongs the life oft he electromagnet.

Figure 9:
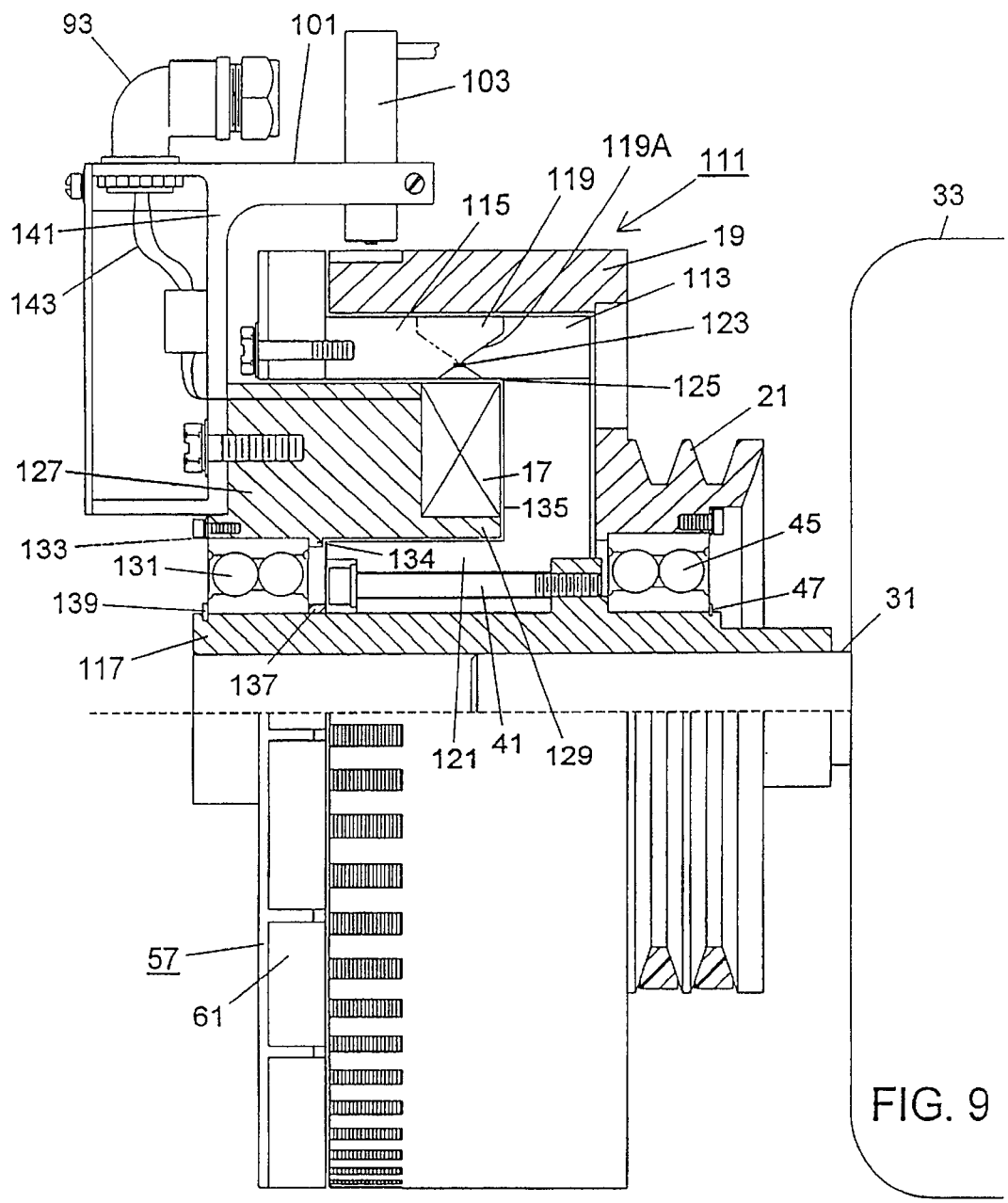
FIG. 9 is a partial cross-sectional side view of the drive, in accordance with another embodiment, showing a brushless design.
Figure 10:
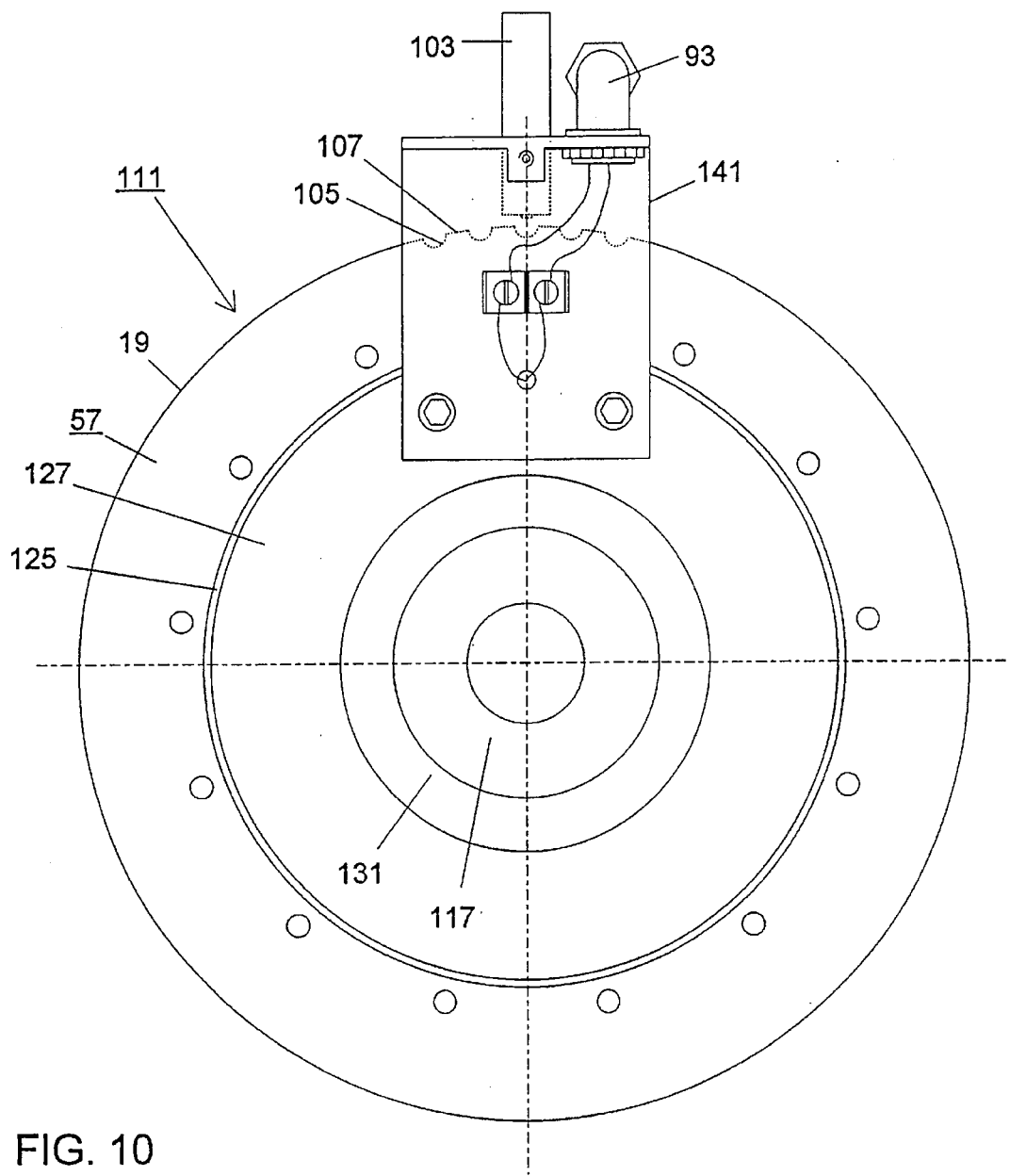
FIG. 10 is a view showing the outer end of the drive of FIG. 9.

In FIGS. 9 and 10, there is shown the drive 111, in accordance with another embodiment. Like numbers in the figures designate similar parts and components. The embodiment of FIGS. 9 and 10 is referred to as a brushless drive, because brushes are not used. Instead, the coil 17 is held in a non-rotating manner relative to the pole pieces 113, 115 and the armature 119. Because the coil 17 is fixed, no slip rings or brushes are required to provide electric current to the coil. Instead, the coil is wired directly to a source of electric power (or to a control circuit regulating the amount of power supplied to the coil).

The hub 117 of the drive 111 has an outer end portion that extends out beyond the pole pieces 113, 115.

The pole pieces have two components, namely an inner pole piece 113 and an outer pole piece 115. The inner pole piece 113 is, referring to the orientation of FIG. 9, shaped like a backwards "C". It has individual poles 119 which are interdigitated with the poles on the outer pole piece 115. The inner pole piece 113 has a mounting portion 121 that contacts the hub 117. The mounting portion is secured to the hub by the bolts 4 1. The outer pole piece 115 is a single piece having an annular portion 122 and plural poles 119 extending from the annular portion.

The outer pole piece 115 is coupled to the inner pole piece 113 by a retaining ring 123 that is nonmagnetic and low in magnetic permeability. Thus, the retaining ring 123 does not detract from the magnetic field coupling between the poles and the armature. For example, the ring 123 could be copper or stainless steel. Furthermore, the retaining ring 123 is located along the inside diameter of the poles 119 so as to not interfere with the magnetic field between the poles and the armature. The inner circumference of each pole 119 is chamfered so as to form a point at the end of each pole. This chamfering forms an upside down "V" cavity as shown in FIG. 1. In the preferred embodiment, the retaining ring 123 is located within this cavity. The retaining ring 123 is secured to the pole pieces 113, 115, such as by welding, so as to make a single pole piece assembly. The fan 57 is bolted to the annular portion of the outer pole piece 115.

Together, the pole piece assembly forms a cavity 125. The coil 17 is located within the pole piece assembly cavity 125. The annular coil 17 is supported within the annular cavity 125 by a coil mount 127. The coil mount 127 has a lip 129 for supporting the coil. The coil can be secured to the coil mount by a suitable adhesive. The coil mount 127 is supported on the hub 117 by bearings 131. The coil mount 127 thus extends from a position outside of the pole pieces to a location inside of the pole piece cavity 125. A snap ring 133 and a step 134 are used to retain the coil mount 127 to the bearings 131. The coil 17 and the coil mount 127 are separated from the pole pieces 113, 115 by a gap 135. The coil 17 remains stationary while the pole pieces 113, 115 rotate relative to the coil. The coil mount 127 is made of the same material as the pole pieces 113, 115, so as to provide a path for a magnetic field about the coil.

The bearings 131 are located on the outer end of the hub 117. The bearings 131 supporting the coil mount 127 are set off from the inner pole piece 113 by a spacer ring 137. A snap ring 139 retains the bearings 131 on the hub 117.

A bracket 141 is bolted onto the coil mount 127. The bracket 141 is shaped like an upside down "L" (referring to the orientation of FIG. 9). The speed sensor 103 is mounted to the extension portion 101 of the bracket 141. The outside diameter of the armature 19 has grooves 105 and peaks 107 to form teeth (see FIG. 10), which teeth are detected by the speed sensor during the rotation of the armature. The teeth extend around the entire circumference of the armature. (In FIG. 10, only a few teeth are shown.) A conduit 93 is coupled to the bracket. The conduit 93 contains the wires 143 for energizing the coil with current. The conduit 93 is anchored to a fixed platform, such as the motor. This anchoring prevents rotation of the coil 17 and the speed sensor.

In operation, the hub 117 rotates the pole pieces 113, 115 at the same speed as the motor shaft 31. The coil 17 does not rotate, as it is held stationary by the anchored or fixed bracket. Because the coil does not rotate, no brushes are required to provide current to the coil.

When no current is applied to the coil, there is no magnetic coupling between the pole pieces and the armature. Therefore, under a load, the sheaves 21 and the armature 19 do not rotate. Application of current to the coil provides magnetic coupling between the pole pieces and the armature, causing the armature and the sheaves to rotate. The coil remains stationary irregardless of the rotation of the pole pieces or the armature.

Because the drive 111 of FIGS. 9 and 10 does not use brushes, less maintenance is required than with drives that do require brushes.

The brushless drive 111 of FIGS. 9 and 10 can easily be assembled and disassembled in the field. This is a deskable characteristic, particularly if a drive picks up dirt or debris and must be cleaned. To disassemble the drive, the snap ring 139 is removed from the hub 117. Then, the bearing 131, the coil mount 127 and the coil 17 are removed from the hub and the pole pieces. The pole piece assembly can be removed by unscrewing the bolts 41. The armature can be removed by removing the snap ring 47. To reassemble the drive, the armature 19 and its bearing are reinstalled into the hub. The pole pieces 113, 115 are bolted in place onto the hub. Then, the coil mount 127 is coupled to the bearing 131. The bearing 131 is installed onto the hub 117 and the coil 17 is located within the cavity 125.

Although the coil mount 127 has been described as a single piece, it may be made of plural pieces. Because the portion of the coil mount outside of the pole piece cavity 125 does not contribute to the magnetic field path around the coil, there is no need for this portion of the cot mount to be magnetic. For example, the coil mount could be made of a magnetic inner piece and a nonmagnetic outer piece. The magnetic inner piece would be located between the outer pole piece 115 and the mounting portion 121 of the inner pole piece 113 and would be adjacent to the coil. This inner piece would maintain a magnetic path around the coil 17. The nonmagnetic outer piece would couple the magnetic inner piece and the coil to the bearing 131. The inner and outer pieces could be joined together by bolts.

Figure 11:
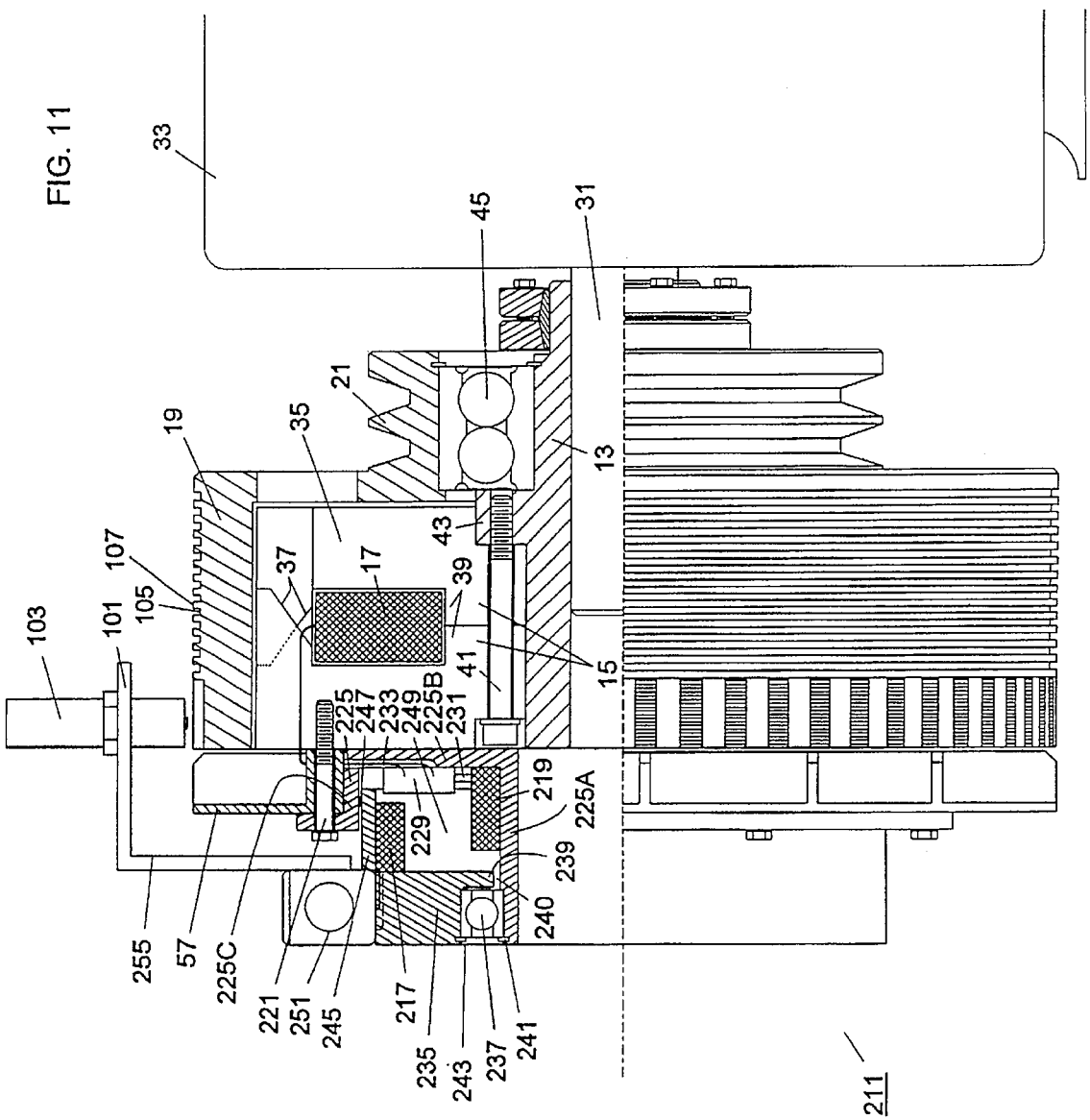
FIG. 11 is a partial cross-sectional side view of the drive, in accordance with a further embodiment showing a rotary transformer for providing current to the rotating coil.
Figure 12:
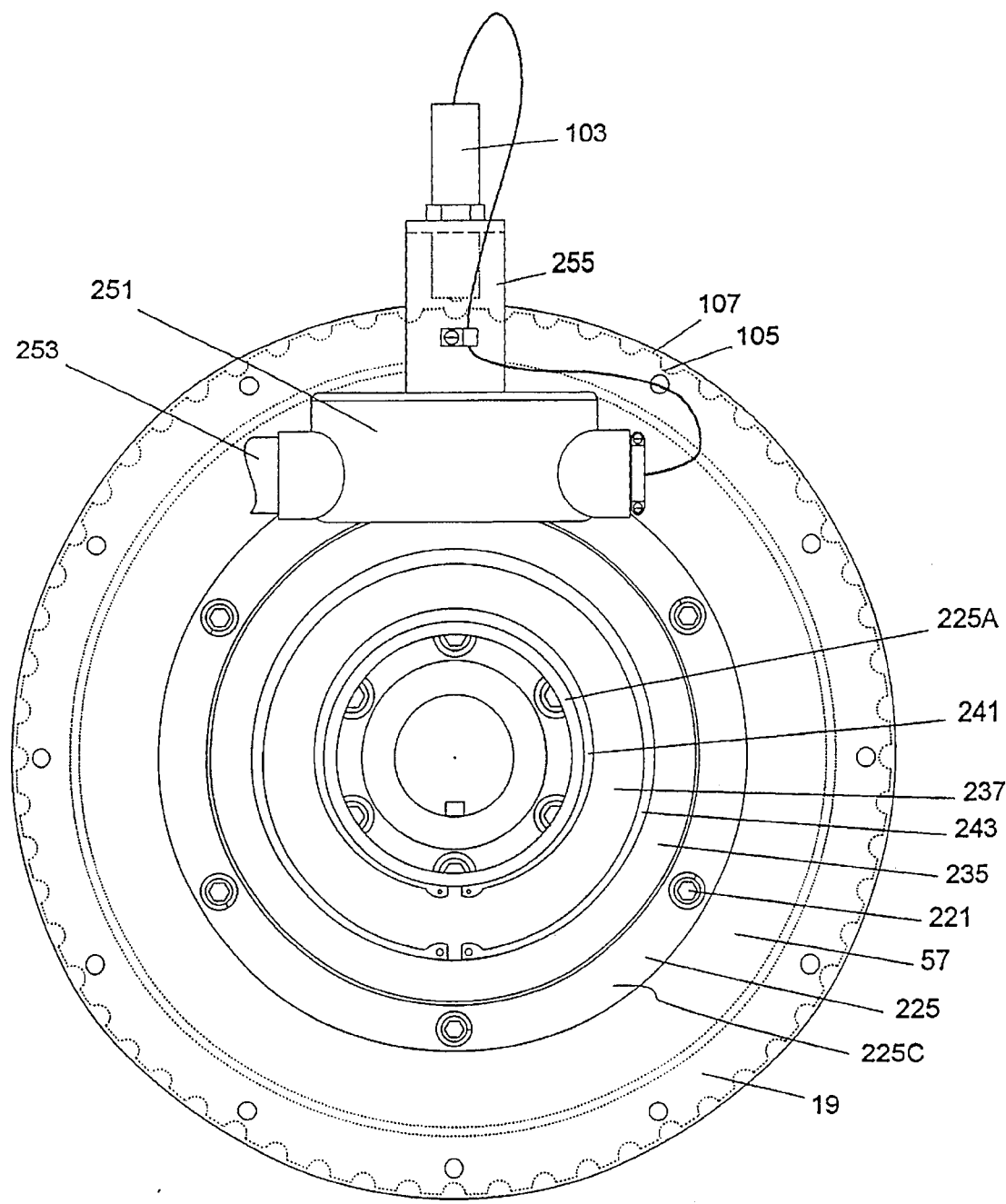
FIG. 12 is a view showing the outer end of the drive of FIG. 11.

In FIGS. 11 and 12 there is shown a drive 211, in accordance with a further embodiment. The drive 211 incorporates an ac inductive rotative power coupling instead of brushes in order to provide electrical current to the rotating coil 17. Like numbers in the figures designate similar parts and components.

The embodiment of FIGS. 11 and 12 is a brushless drive in which the pole pieces 15 and the drive coil 17 rotate relative to the armature 19. (In the embodiments of FIGS. 11-13, the coil 17 will be referred to as a drive coil to distinguish it from the power coupling coils.) The drive 211 of FIG. 11 combines the relatively continuous pole pieces 15 of the drive 11 of FIG. 1 with a brushless design. Use of a relatively continuous pole pieces minimizes gaps in the pole pieces which reduce the overall efficiency of the drive.

In order to connect the rotating coil 17 to a source of electric power or a control circuit regulating the amount of power supplied to the coil 17, a pair of inductively coupled coils 217 and 219 are used. One coil 217 is mounted stationary relative to the rotating coil 17 and the pole pieces 15. The electrical power source or control circuit is wired directly to the stationary coil 217. The second coil 219 is rotatably mounted adjacent to the stationary coil 217 and rotates in unison with the coil 17 and the pole pieces 15. The rotating coil 219 is wired via the bridge rectifier to the coil 17. Current applied to the stationary coil 217 by the power source induces a current in the rotating coil 219 which is supplied to the coil 17.

The structure of the ac inductive rotative power coupling drive 211 will now be described. The structure of the load portion of the drive 211 including the sheaves 21, the bearings 45 and the armature 19 is identical to the load portion of the drive 11 which is described above.

The rotating coil 219 is coupled to an inner section 225 which in turn is coupled to the fan 57 with bolts 221. A first portion 225A of the inner section extends outward from the pole pieces 15 and has an inside diameter slightly larger than the outside diameter of the hub 13. The first portion 225A is a hollow tube. Adjacent the pole pieces 15, a second portion 225B of the inner section extends radially outward from the first portion 225A to the fan 57. The rotating coil 219 is coupled to the first portion 225A of the inner section so as to abut the second portion 225B. The coil 219, which is annular in shape, can be coupled to the first portion 225A by adhesive bonding. The inner section also has a third portion 225C, which is "L" shaped in cross-section. The third portion extends from the outer circumferential end of the second portion 225B in a direction that is parallel to the first portion 225A. Thus, the third portion 225C also forms a hollow tube. The inner portion 225 is bolted to the fan by bolts 221, which extend through the third portion 225C.

A bridge rectifier 229 is coupled (by adhesive bonding) to the second portion 225B of the inner section adjacent to the rotating coil 219. The bridge rectifier 229 is electrically connected between the rotating coil 219 and the coil 17. The bridge rectifier 229 provides direct current to the coil 17 from an alternating current induced in the rotating coil 219 by an ac electrical power source. The bridge rectifier is electrically connected to the rotating coil 219 with wires 231. Wires 233 extend through the fan 57 and electrically connect the bridge rectifier 229 and the coil 17.

The stationary coil 217 is mounted to and supported by a coil mount 235 which remains stationary relative to the coil 17 and the rotating coil 219. The coil mount 235 is supported on the first portion 225A of the inner section by bearings 237 located about the outside diameter of the first portion 225A. The bearings 237 are held in place on the first portion 225A by a shoulder 239 of the coil mount 235, a shoulder of the first portion 225A, and snap rings 241 and 243. The shoulder 239 is separated from the first portion 225A by a gap 240.

The coil mount 235 extends radially outward from the bearings 237. The coil mount 235 forms a lip 245 at the outer radial edge of the coil mount 235. The lip 245 extends towards the pole pieces 15 adjacent to an inside diameter of the third portion 225C. The lip 245 is separated from the third portion 225C by a gap 247. The stationary coil 217 is secured with a suitable adhesive to the inside diameter of the lip 245 of the coil mount 235 facing the rotating coil 219.

The coil mount 235, lip 245, and first and second portions 225A and 225B of the inner section 225 form a cavity 249 across which the coils 217 and 219 are opposed. The coil mount 235 and the inner section are formed of magnetic susceptible materials in order to maintain a magnetic path about the coils 217 and 219. The coil mount 235 and the inner section 225 can be formed of iron, magnetically susceptible low carbon steel, amorphous silicon steel, or powdered ferrite core material.

A junction box 251 is secured to a flattened portion of the outside diameter of the coil mount 235. Referring to FIG. 12, a conduit 253 couples the junction box 251 to a fixed platform (such as the motor 33 or the ground), in order to prevent rotation of the coil mount 235. Similar coupling to prevent rotation is shown in FIG. 1. Wires extend from the junction box 251 through the coil mount 235 to the stationary coil 217 to electrically connect the stationary coil 217 to the power source. The junction box 251 is fastened to the coil mount 235 with screws (not shown).

A bracket 255 is coupled to the conduit 251. The bracket 255 is shaped like an upside down "L" (referring to the orientation as shown in FIG. 11). The bracket 255 is oriented to extend over the armature 19. The speed sensor 103 is mounted to an extension portion 101 of the bracket 255 in a position to detect movement of the teeth formed by the grooves 105 and peaks 107 of the armature 19 (see FIG. 12).

In operation, the hub 13 rotates the pole pieces 15 at the same speed as the motor shaft 31. The coil 17 is rotated with the pole pieces 15.

In order to provide electrical current to the coil 17, alternating current is applied to the stationary coil 217. The alternating current may be varied, for example, between a potential of 0 to 120 volts, and may be various wave types including sinusodial, square wave, and triangular. In addition, the alternating current need not be at 60 Hz, but can be other frequencies.

When no current is applied to the stationary coil 217 there is no current induced in the rotating coil 219 and thus no current is provided to the coil 17. Therefore, there is no magnetic coupling between the pole pieces 15 and the armature 19. Under a load the sheaves 21 and the armature 19 do not rotate if there is no magnetic coupling between the armature 19 and the pole pieces 15.

When alternating current is applied to the stationary coil 217, current is induced in the rotating coil 219 through the coil mount 235 and the inner piece 225. A magnetic path is formed between the coils 217, 219 by way of (going in a counterclockwise direction in FIG. 11) the coil mount 235, the shoulder 239, the gap 240, the first portion 225A, the second portion 225B, the third portion 225C, the gap 247 and the lip 245. The bridge rectifier 229 transforms alternating current supplied by the rotary coil 219 to direct current which is supplied to the coil 17. The current in the coil 17 causes the pole pieces 15 and the armature 19 to become magnetically coupled, thereby rotating the armature 19 and the sheaves 21. Increasing the voltage (or power) to the stationary coil 217 increases the magnetic coupling between the pole pieces 15 and the armature 19, thereby increasing the rate of rotation of the armature 19.

Because the drive 211 of FIGS. 11 and 12 does not use brushes, less maintenance is required than with drives that do use brushes. Furthermore, because no gap is required between the coil 17 and the pole pieces 15 the drive 211 is more efficient than drives which require a gap between the coil and pole pieces.

Figure 13:
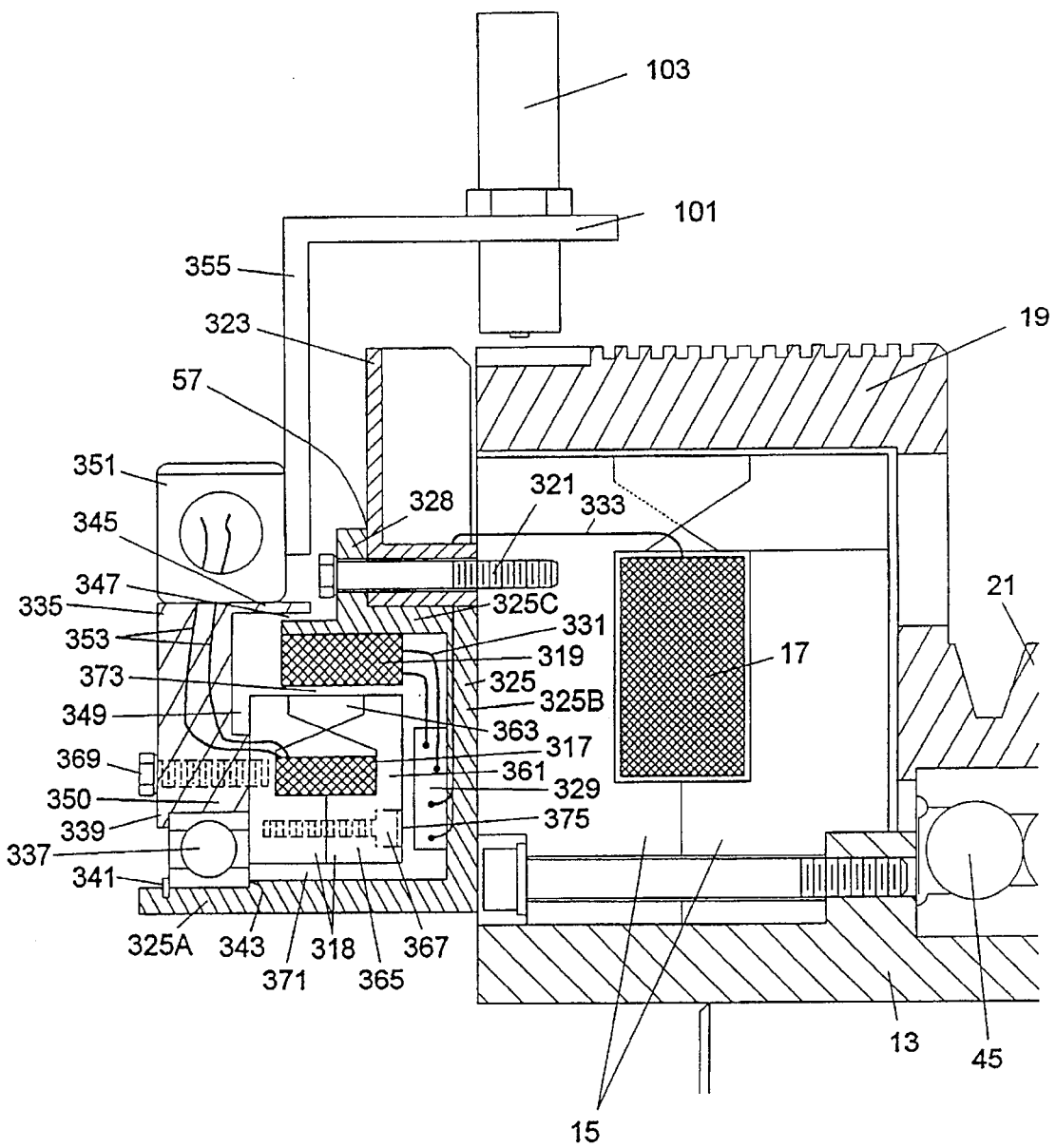
FIG. 13 is a partial cross-sectional side view of the drive, in accordance with a still further embodiment showing an alternator for providing current to the rotating coil.

In FIG. 13 there is shown a drive 311, in accordance with a still further embodiment. The drive 311 is also a brushless drive. An alternator rotative power coupling is used to provide electrical current to the coil 17. Again, like numbers in the figures designate similar parts and components.

The embodiment of FIG. 13 is a brushless drive 311 in which the coil 17 rotates relative to the armature 19 along with the pole pieces 15. The drive 311 operates from a direct current power source and provides direct current to the coil 17 in order to magnetically couple the pole pieces 15 and the armature 19.

The alternator rotative power coupling includes a stationary coil 317, stationary pole pieces 318, a rotating coil 319 and a bridge rectifier 329. The alternator rotative power coupling provides current to the coil 17 in response to power supplied from the direct current power source. The power source is electrically connected to the stationary coil 317 which is located within the stationary pole pieces 318. The rotating coil 319 is located to rotate about the stationary pole pieces 318 and the stationary coil 317. Application of current from the power source through the stationary coil 317 causes a magnetic field to be generated about the stationary pole pieces 318. Rotation of the rotating coil 319 through the magnetic field about the stationary pole pieces 318 induces an alternating current in the rotating coil 319. The rotating coil 319 is electrically connected to the bridge rectifier 329 which converts the alternating current to direct current. The direct current from the bridge rectifier is then supplied to the coil 17. The electrically energized coil 17 induces magnetic coupling between the rotating pole pieces 15 and the armature 19 causing the armature 19 to rotate and drive a load.

The structure of the alternator rotative power coupling drive 311 as shown in FIG. 13 will now be described. The structure of the load portion of the drive 311 including the sheaves 21, bearings 45, and armature 19 is identical to the load portion of the drive 11 which is described above with reference to FIG. 1. The structure of the hub 13, pole pieces 15, and coil 17 of the drive 311 is also identical to the structure of the hub 13, pole pieces 15 and coil 17 of the drive 11 and is also identical to the hub 13, pole pieces 15 and coil 17 of the drive 211, both of which are described above.

The annular rotating coil 319 is coupled to an inner section 325 which is bolted to the fan 57 and the pole pieces 15 with bolts 321. The inner section 325 has a first portion 325A, a second portion 325B, and a third portion 325C. The first portion 325A of the inner section extends outwards from the pole pieces 15 and has an inside diameter slightly larger than the outside diameter of the hub 13. The first portion 325A forms a hollow robe. The second portion 325B of the inner section extends radially outward from the first portion 325A adjacent the pole pieces 15 to the fan 57. The third portion 325C extends from the outer radial edge of the second portion 325B in a direction that is parallel to the first portion 325A. Thus, the third portion 325C also forms a hollow robe. The rotating coil 319 is adhesively bonded to the inside diameter of the third portion 325C and extends around the entire inside diameter of the third portion 325C. Bolts 321 extend through a shoulder 328 of the inner section 325 to join the inner section 325 to the pole pieces 15.

The rotating coil 319 can be a single phase coil or a three phase coil.

Figure 23:
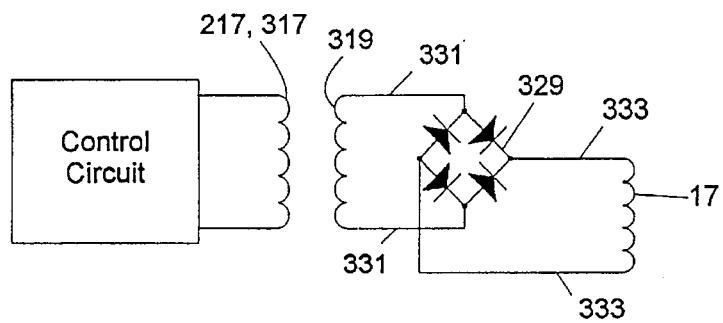
FIG. 23 is an electrical schematic of a bridge rectifier used in conjunction with the drives of FIGS. 11 and 13.

The bridge rectifier 329 is adhered to the outer face of the second portion 325B. Referring to FIG. 23, the bridge rectifier 329 is electrically connected between the rotating coil 319 and the coil 17. Wires 331 electrically connect the bridge rectifier 329 with the rotating coil 319, and wires 333 extend through the fan 57 and the pole pieces 15 to electrically connect the bridge rectifier 329 and the coil 17. The bridge rectifier 229 (of FIG. 11) and its connections to the coils is the same as the bridge rectifier 329 shown in FIG. 23.

The stationary pole pieces 318 are mounted to and supported by a coil mount 335 which remains stationary relative to the coil 17, pole pieces 15, and the rotating coil 319. The coil mount 335 is supported on the first portion 325A by bearings 337 located about the outside diameter of the first portion 325A. The bearings 337 are held in place by a shoulder 339 of the coil mount 335 and a snap ring 341 on one side, and by a shoulder 343 of the first portion 325A and the stationary pole pieces 318 on the other side.

The coil mount 335 extends radially outward from the bearings 337. At the outer radial edge of the coil mount 335 is a lip 345. The lip 345 extends towards the pole pieces 15 and provides a surface for mounting a junction box 351. The coil mount 335 and the inner section 325 of the fan 57 form a cavity 349 in which the rotating coil 319, stationary pole pieces 318, and the stationary coil 317 are located.

The stationary pole pieces 318 are located in the cavity 349 and are mounted to a shoulder 350 of the coil mount 335. There are two stationary pole pieces 318, an inner piece and an outer piece. Each stationary pole piece 318 is made up of an annular portion 361 with poles 363 extending from the outer diameter of the annular portion 361, and a lip 365 extending from the inner diameter of the annular portion 361. The poles 363 on an individual stationary pole piece 318 are spaced apart by gaps. When the stationary pole pieces 318 are assembled as shown, the poles 363 of the inner and outer stationary pole pieces 318 are interdigitated so as to form alternating magnetic polarities around the circumference of the assembly of the stationary pole pieces 318.

The assembled stationary pole pieces 318 encircle the stationary annular coil 317. The stationary coil 317 is located between and is encircled by the annular portions 361, the poles 363, and the lips 365 of the stationary pole pieces 318. The inner and outer stationary pole pieces 318 are bolted together about the stationary coil 317 with bolts 367. The assembled stationary pole pieces 318 encompassing the stationary coil 317 are mounted to the shoulder 350 oft he coil mount 335 with bolts 369. The mounted stationary pole pieces 318 and stationary coil 317 extend around the circumference of the first portion 325A and are separated therefrom by a gap 371. The inner stationary pole pieces 318 are separated from the bridge rectifier 329 by gap 375. These gaps 371, 375 are provided so that the pole pieces 318 remain stationary without interfering with the rotating first portion 325A and bridge rectifier 329.

The poles 363 of the stationary pole pieces 318 are separated from the rotating coil 319 by a gap 373.

Current is supplied to the stationary coil 317 from an electrical power source through wires 353. The wires 353 extend from the stationary coil 317 through the stationary pole pieces 318 and the coil mount 335 to a junction box 351. A conduit is used to couple the junction box 351 and the coil mount 335 to a fixed or stationary platform, such as the motor. Thus, the pole pieces 318 and coil 317 are stationary, while the coil 319, the pole pieces 15 and the coil 17 are rotating at motor speed. The junction box 351 is anchored to the coil mount 335 with screws (not shown).

A bracket 355 is coupled to the conduit 351. The bracket 355 is oriented to extend over the armature 19. The speed sensor 103 is mounted to an extension portion 101 of the bracket 355 to detect movement of the armature 19.

In operation, dc current is provided to the stationary coil 317 in order to energize the coil 17. As dc current is provided to the stationary coil 317, a magnetic field is created between the poles 363. This magnetic field extends across the gap 373 to the rotating coil 319, wherein alternating current is induced into the rotating coil. The induced current is converted to dc by the bridge rectifier 329, which dc current is then used to energize the coil 17.

To vary the amount of current supplied to the coil 17 and thus the coupling of the armature 19 to the pole pieces 15, the voltage and/or current provided to the stationary coil 317 is varied. When little or no current is supplied to the stationary coil 317, the coil 17 is not sufficiently energized and little or no coupling occurs between the armature 19 and the pole pieces 15. Thus, the armature 19 does not rotate. As more current is applied to the stationary coil 317, more current is induced into the rotating coil 319 and more current is provided to the coil 17 in order to rotate the armature.

The alternator rotative coupling drive 311 of FIG. 13 is brushless and therefore requires less maintenance than drives that use brushes. The drive 311 also is more efficient than drives requiring a gap between the coil and the pole pieces since no gap is required between the coil and pole pieces of drive 311.

Figure 14:
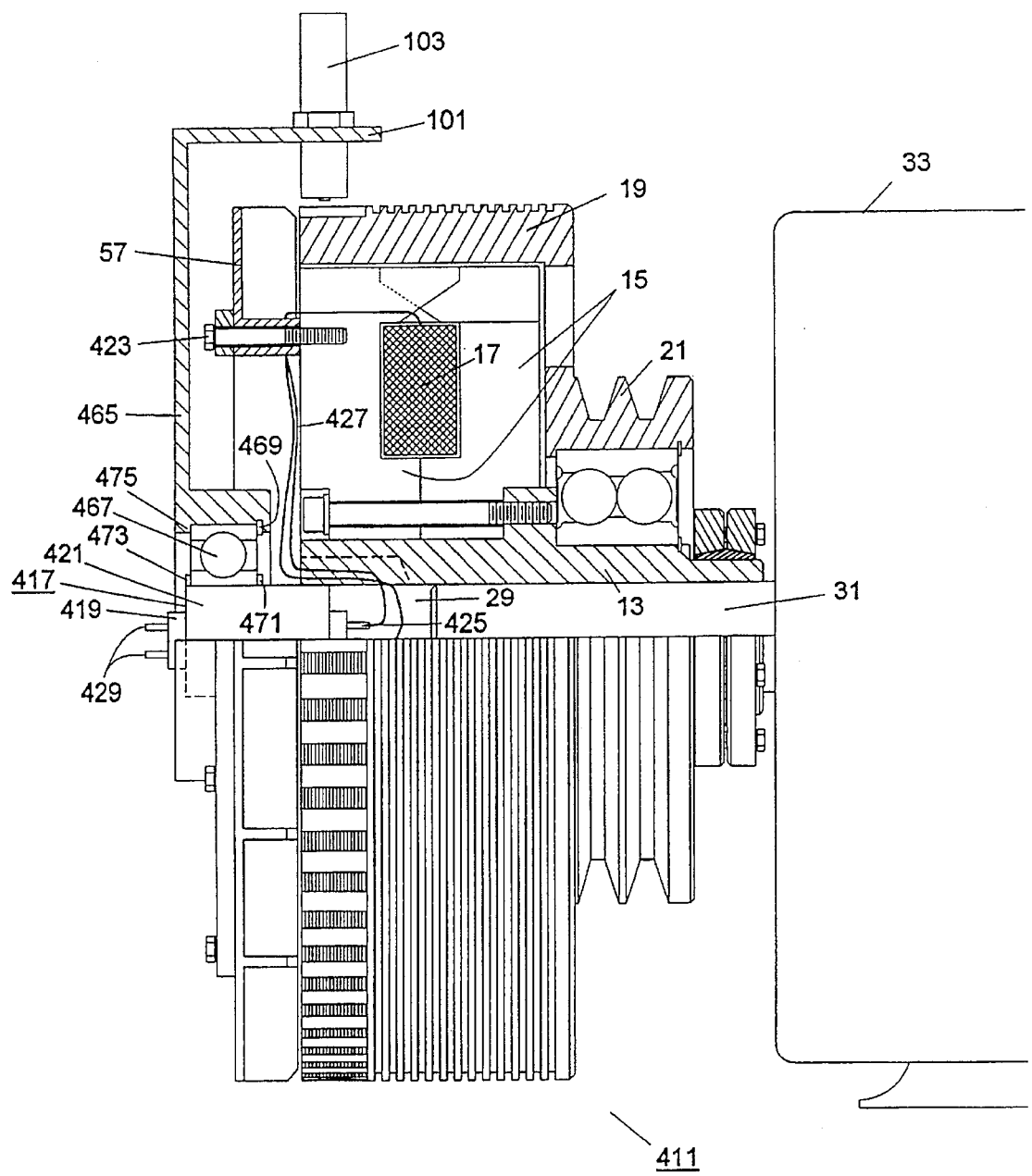
FIG. 14 is a partial cross-sectional side view of the drive, in accordance with a still further embodiment showing a liquid filled rotary slip ring for providing current to the rotating coil.

In FIG. 14 there is shown a drive 411, in accordance with a still further embodiment. The drive 411 utilizes a liquid conductor rotative coupler 417 to supply current to the coil 17. Again, like numbers in the figures designate similar parts and components. The embodiment of FIG. 14 is a brushless drive in which the coil 17 rotates relative to the armature 19 along with the pole pieces 415. The drive 411 operates from a direct current power source and provides direct current to the coil 17. The coil 17 is encompassed by the pole pieces 415 so that no gap separates the coil 17 and pole pieces 415 thereby providing efficient magnetic coupling between the coil 17 and the pole pieces 415 when the coil 17 is electrically charged.

A mercury coupler 417 electrically connects the coil 17 and the power source so that current may be supplied to the coil 17 from the power source through the mercury coupler 417. The mercury coupler 417 has an inner housing 419 and an outer housing 421. The inner and outer housings 419 and 421 are rotatable with respect to each other. Electrical contacts couple the inner and outer housing 419 and 421 so that electrical power may be transmitted between the inner and outer housings 419 and 421. The electrical power source is electrically connected to the inner housing 419 and the coil 17 is electrically connected to the outer housing 421. The inner housing 419 remains stationary relative to the coil 17 while the outer housing 421 rotates with the coil 17. Current is transmitted from the power source through the inner housing 419 to the outer housing 421 and from the outer housing 421 to the coil 17. The current in the coil 17 causes the pole pieces 15 to magnetically couple the armature 19, rotating the armature 19 and driving a load.

The structure of the mercury rotative electrical connector drive 411 as shown in FIG. 14 will now be described. The structure of the load portion of the drive 411 including the sheaves 21, bearings 45, and armature 19 is identical to the load portion of the drive 11 which is described above with reference to FIG. 1. The structure of the hub 13, pole pieces 15, and coil 17 of the drive 411 is identical to the structure of the hub 13, pole pieces 15 and coil 17 of the drive 11 of FIG. 1 and is also identical to the hub 13, pole pieces 15 and coil 17 of the drive 211 of FIG. 11, both of which are described above. The fan 57 is coupled to the outer pole piece 15 with bolts 423 and rotates with the pole pieces 15 and the coil 17.

The mercury coupler 417 is coupled to the outer end of the hub 13. The outer housing 421 of the mercury coupler 417 is located in the cylindrical cavity 29 of the hub 13 opposite the shaft 31 of the motor 33. The outer housing 421 is secured to the hub 13 with a suitable adhesive. The outer housing 421 is rotated by the hub 13 along with the coil 17 and the pole pieces 15 when the hub 13 is rotated by the motor shaft 31. The inner housing 419 of the mercury coupler 417 extends out of the outer housing 421 away from the hub 13. The mercury coupler is thus located so that its axis of rotation is coaxial with the axis of rotation of the drive 411.

Contacts 425 extend from the outer housing 421 of the mercury coupler 417 so that the coil 17 may be electrically connected to the outer housing 421. Wires 427 couple to the contacts 425 and extend through the hub 13, fan 57 and pole pieces 15 to the coil 17. Contacts 429 extend from the inner housing 419 so that the inner housing 419 may be electrically connected to a power source.

Figure 15:
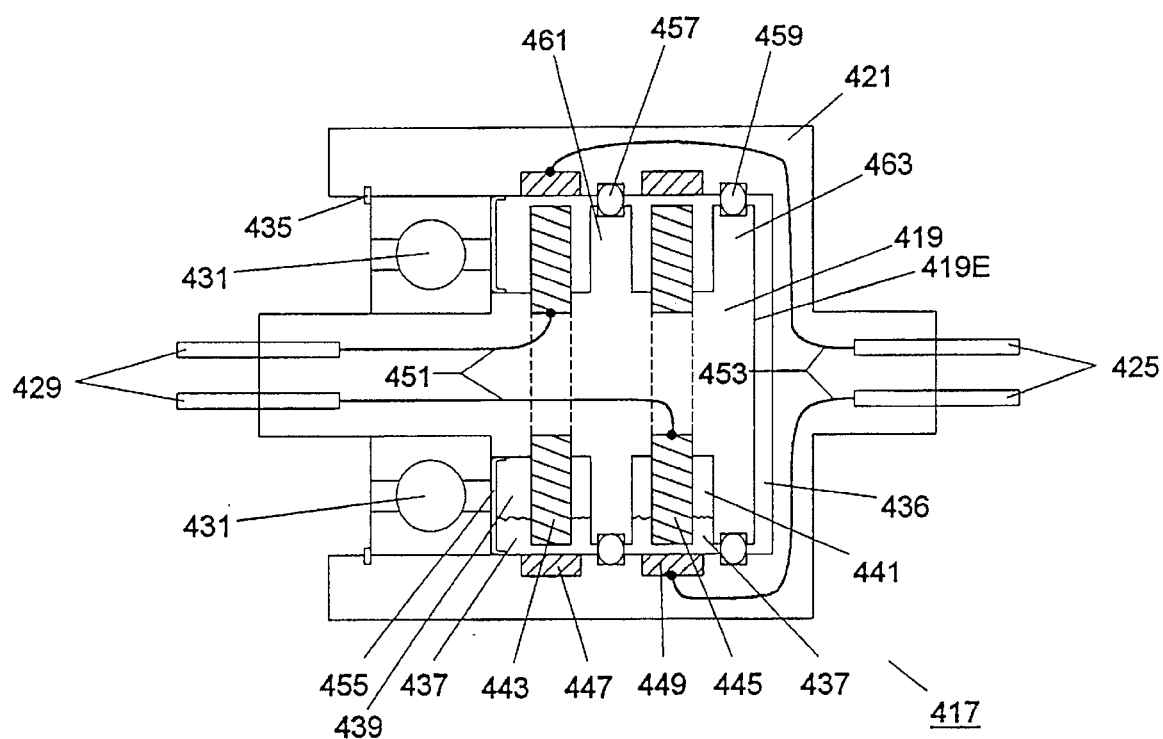
FIG. 15 is a partial cross-sectional side view of the liquid filled slip ring used in the embodiment of the drive of FIG. 14.

Referring now to FIG. 15, the mercury coupler 417 will be described in further detail. The mercury coupler 417 is conventional and commercially available. The outer housing 421 is rotatively located about the inner housing 419 on sealed bearings 431. The bearings 431 are pressed fit between the inner and outer housings 419 and 421. A snap ring 435 is on the outer end of the bearing 431. A gap 436 extends between the inner and outer housings 419 and 421 at the inner end of the inner housing 419E so that the housings 419 and 421 may move relative to each other.

The inner and outer housings 419 and 421 are electrically connected by mercury 437 or some other liquid conductor located in channels 439 and 441 which conductively couples inner contact rings 443 and 445 of the inner housing 419 and outer contact rings 447 and 449 of the outer housing 421. The respective contacts 429 are electrically connected to the respective inner contact rings 443 and 445 with wires 451 which extend through the inner housing 419. The inner contact rings 443 and 445 are secured to the inner housing 419 and extend from the inner housing 419 into the channels 439 and 441, respectively, a sufficient distance to contact the mercury 437 in the channels 439 and 441. The outer ring contacts 447 and 449 are located in the outer housing 421 adjacent the channels 439 and 441, respectively, so that the outer ring contacts 447 and 449 contact the mercury 437 in the channels 439 and 441. Respective contacts 425 are electrically connected to the respective outer ring contacts 447 and 449 with wires 453 which extend through the outer housing 421. The contacts 425 and 429, wires 451 and 453, inner contact rings 443 and 445, mercury 437, and outer contact rings 447 and 449 are arranged so that two continuous conductive paths may be formed through the coupler 417.

The mercury 437 is retained within the respective channels 439 and 441 by seals 455, 457 and 459. The channel 439 is formed between the sealed bearings 431, the outer housing 421, the inner housing 419, and a shoulder 461 of the inner housing 419. The seal 455 extends between the inner and outer housings 419 and 421 along the bearings 431 to prevent mercury 437 from seeping through the bearings 431. The seal 457 extends between the shoulder 461 and the outer housing 421 to prevent mercury 437 from moving between channel 439 and channel 441. The channel 441 is formed between the outer housing 421, the inner housing 419, the shoulder 461, and another shoulder 463 of the inner housing 419. The seal 459 extends between the shoulder 463 and the outer housing 421 to prevent mercury from escaping from channel 441 into the gap 436.

Referring back to FIG. 14, a bracket 465 is mounted to extend over the armature 19. The bracket 465 is mounted on bearings 467 so that the bracket 465 is held stationary relative to the coil 17, pole pieces 15, and the fan 57. The bearings 467 are mounted to the outer housing 421 of the mercury coupler 417. The inner face of the bearings 467 is held in place on the mercury coupler 417 by snap rings 469 and 471. The outer face of the bearings 467 is held in place by snap ring 473 and a shoulder 475 of the bracket 465. The bracket 465 extends radially outward from the bearings 467. At the outermost radial position of the bracket 465 an extension portion 101 of the bracket 465 extends back over the armature 19. A speed sensor 103 is mounted to the extension portion 101 to detect rotation of the armature 19.

In operation, the inner housing 419 is secured to a fixed platform, such as the motor 33, by way of a conduit, such as is shown in FIG. 1. Electrical current is supplied to the coil 17 by way of the coupling 417.

Although the coupling 417 has been described as having its outer housing 421 coupled to a rotating part of the drive, the outer housing could be coupled to a stationary platform and the inner housing 419 is then coupled to a rotating part (such as the hub) of the drive.

The power coupler devices of FIGS. 11, 13 and 14 could be used on a drive where the armature is coupled to the motor shaft (for example, by way of a hub) and the coil 17 and pole pieces are coupled to the load.

All of the drives 11, 111, 211, 311, 411 discussed above may be configured with various input and output structures. FIGS. 16–19 illustrate the various input and output configurations of the exemplary drive 211. However, the illustrated input/output configurations of drive 211 may also be utilized in the drives 11, 111 and 311.

Figure 16:
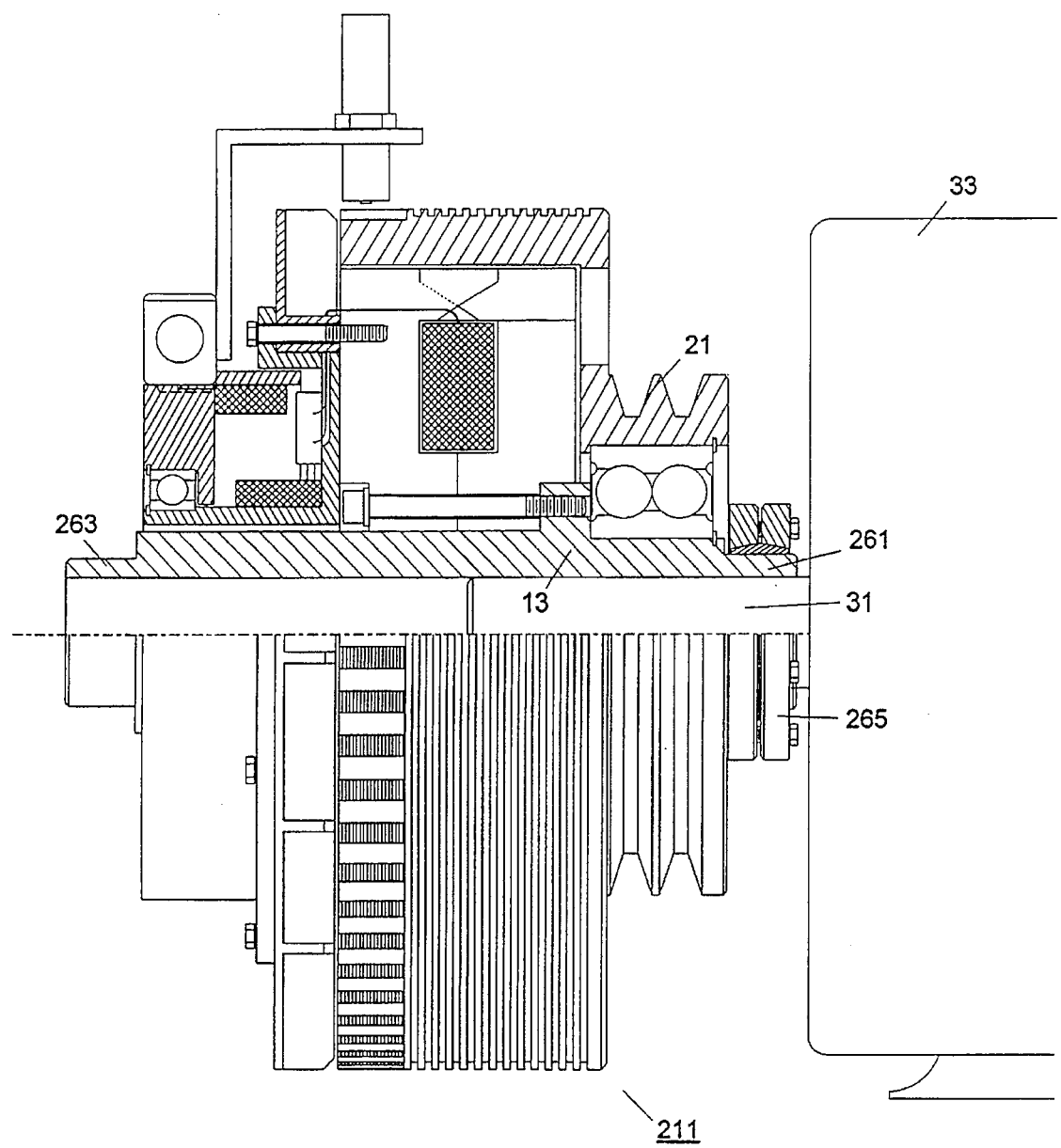
FIG. 16 is a cross-sectional side view of the drive of FIG. 11 illustrating another embodiment of the input/output mechanisms of the drive.

Referring now to FIG. 16, a through shaft version of the drive 211 is shown. The hub 13 extends completely through the drive. The motor 33 can be located at either end of the hub 13. The hub 13 accepts the motor shaft 31 at either end of the hub 13. The hub 13 has shoulders 261 and 263 at each end of the hub which are formed by sections of the hub having a narrower diameter than the body of the hub. The clamping device 265 may be clamped about either shoulder 261 or 263 to clamp the motor 33 to the hub 13. The through shaft configuration of the drive provides flexibility in the orientation of the drive with respect to the motor 33 and the load (which is coupled to the sheaves 21). The motor may be located at the same end of the drive as the sheaves 21 which drive the load, or the motor may be located at the opposite end of the drive from the sheaves 21.

Figure 17:
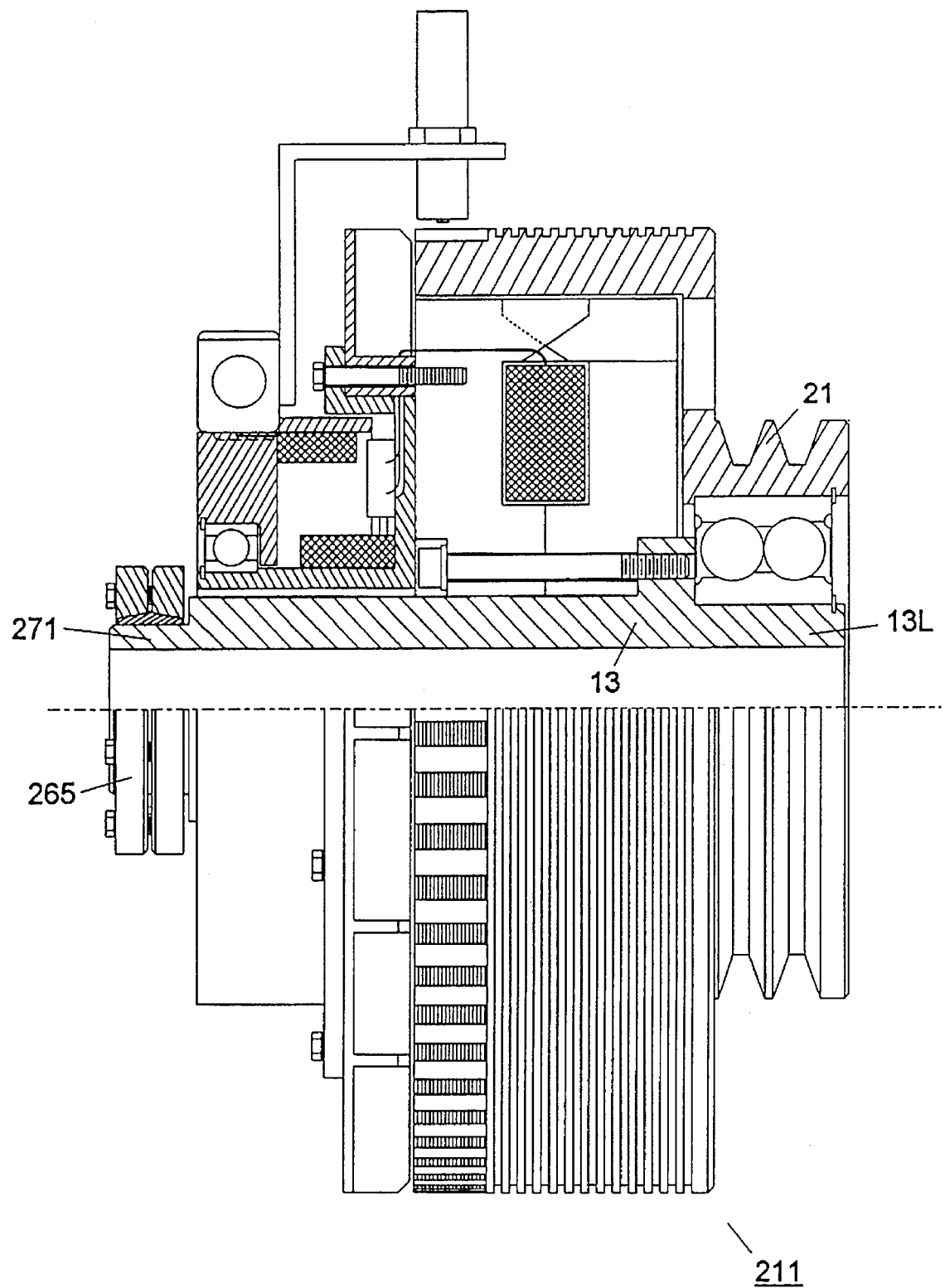
FIG. 17 is a cross-sectional side view of the drive of FIG. 11 illustrating a further embodiment of the input/output mechanisms of the drive.

Referring now to FIG. 17, an inverted sheave version of the drive 211 is shown. The hub 13 extends completely through the drive. The motor (not shown) is located at the opposite end of the drive from the sheaves 21 which drive the load. The hub 13 accepts the motor shaft (not shown) opposite the load end 13L of the hub. The hub 13 has a shoulder 271 at the end of the hub 13 which accepts the motor shaft. The clamping device 265 may be clamped about the shoulder 271 to clamp the motor to the hub 13. The inverted sheave drive is useful when the load is located in a confined area. The motor may be located away from the confined area and the sheaves 21 may be coupled to the load.

Figure 18:
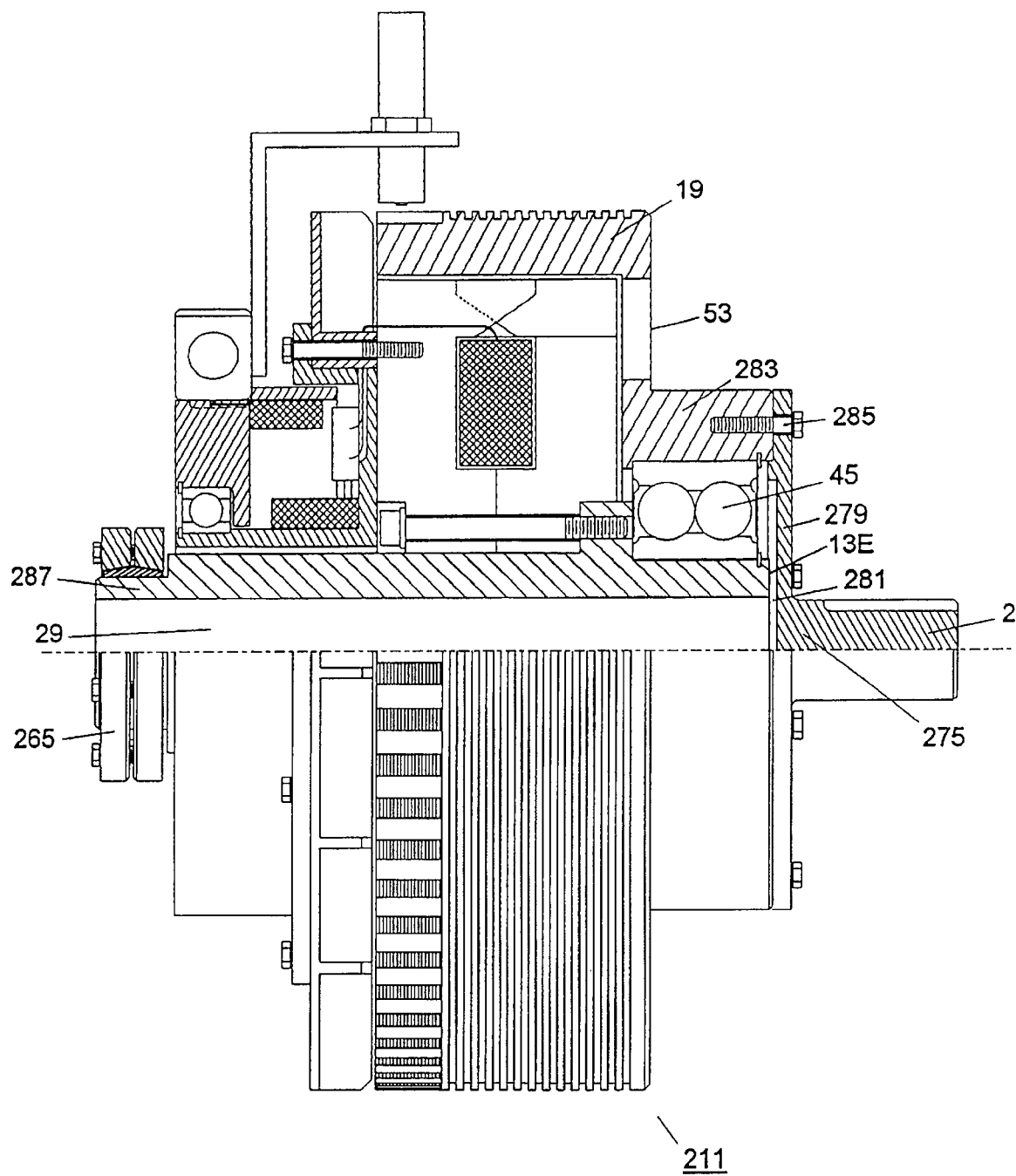
FIG. 18 is a cross-sectional side view of the drive of FIG. 11 illustrating a still further embodiment of the input/output mechanisms of the drive.

Referring now to FIG. 18, a shaft in-shaft out version of the drive 211 is shown. The motor shaft (not shown) provides the input to the drive and an output shaft 275 provides output from the drive. The output shaft 275 is used to drive the load. The output shaft 275 has a shaft portion 277 and a flange 279. The shaft portion 277 is aligned in line with the cylindrical cavity 29 of the hub 13 adjacent the end of the hub 13E separated from the hub by a gap 281 so that rotation of the hub 13 does not influence the shaft portion 275. The flange 279 integrally couples and extends radially from the shaft portion 277 adjacent the gap 281. The flange 279 is secured to a shaft mount 283 with bolts 285. The shaft mount 283 rides on bearings 45 and is coupled to the armature 19 by the radial wall 53. The shaft 275, therefore, is rotated by the armature 19 when the armature 19 is rotated due to magnetic coupling between the armature 19 and the pole pieces 15.

The motor (not shown) is coupled to the drive opposite the output shaft 275. The hub 13 receives the motor shaft in the cylindrical cavity 29 opposite the end of the hub 13E adjacent the shaft 275. The hub 13 has a shoulder 287 about which a clamping device 265 may be located for clamping the hub 13 to the motor. The motor and the output shaft 275 are located relative to one another so that the shaft in-shaft out drive may be coupled in line between the motor and the load. The shaft in-shaft out drive is useful for driving loads such as a pump or a gear box.

Figure 19:
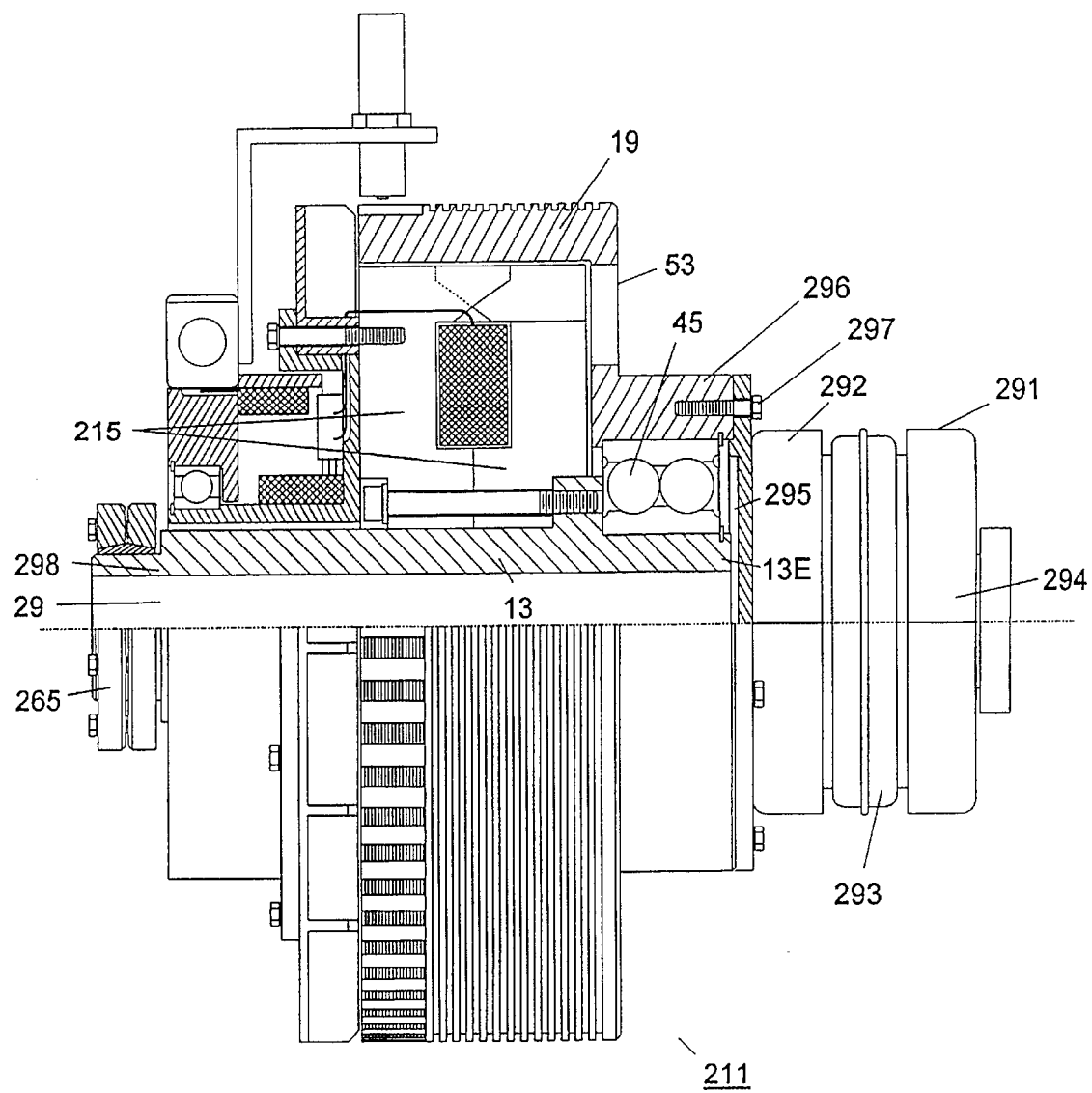
FIG. 19 is a cross-sectional side view of the drive of FIG. 11 illustrating a still further embodiment of the input/output mechanisms of the drive.

Referring now to FIG. 19, a shaft in-flexible coupling out version of the drive 211 is shown. The motor shaft (not shown) provides the input to the drive and the flexible coupling 291 provides output from the drive. The flexible coupling 291 is used to drive the load. Conventional commercially available flexible couplings such as that described in U.S. Pat. No. 3,283,535 may be used as the flexible coupling 291.

The flexible coupling 291 is located in line with the axis of the hub 13. The flexible coupling 291 has a rigid inner flanged portion 292, a flexible center portion 293, and a rigid load coupling portion 294. The inner flanged portion 292 is located adjacent an end of the hub 13E and bearings 45, separated from the hub and bearings 45 by a gap 295. The inner flanged portion 292 is coupled to a coupling mount 296 with bolts 297. The coupling mount 296 is located on the bearings 45 and is coupled to the armature 19 by the radial wall 53. The inner flanged portion 292, flexible center portion 293, and load coupling portion 294 are coupled together so that a load coupled to the load coupling portion 294 is joined to the armature through the flexible center portion 293 and the inner flanged portion 292. Therefore, the flexible coupling 291 is rotated by the armature 19 when the armature 19 is rotated due to magnetic coupling between the armature 19 and the pole pieces 15.

The motor (not shown) is coupled to the drive end that is opposite the flexible coupling 291. The hub 13 receives the motor shaft in the cylindrical cavity 29 opposite the end of the hub 13E adjacent the flexible coupling 291. The hub has a shoulder 298 about which a clamping device 265 may be located for clamping the hub to the motor. The motor and the flexible coupling 291 are located relative to one another so that the drive may be coupled generally in line between the motor and the load. The flexible center portion 293 of the flexible coupling 291 allows the load to be misaligned from an in-line position with respect to the motor. The shaft in-flexible coupling out drive is useful for driving loads such as pumps or gear boxes.

Figure 20:
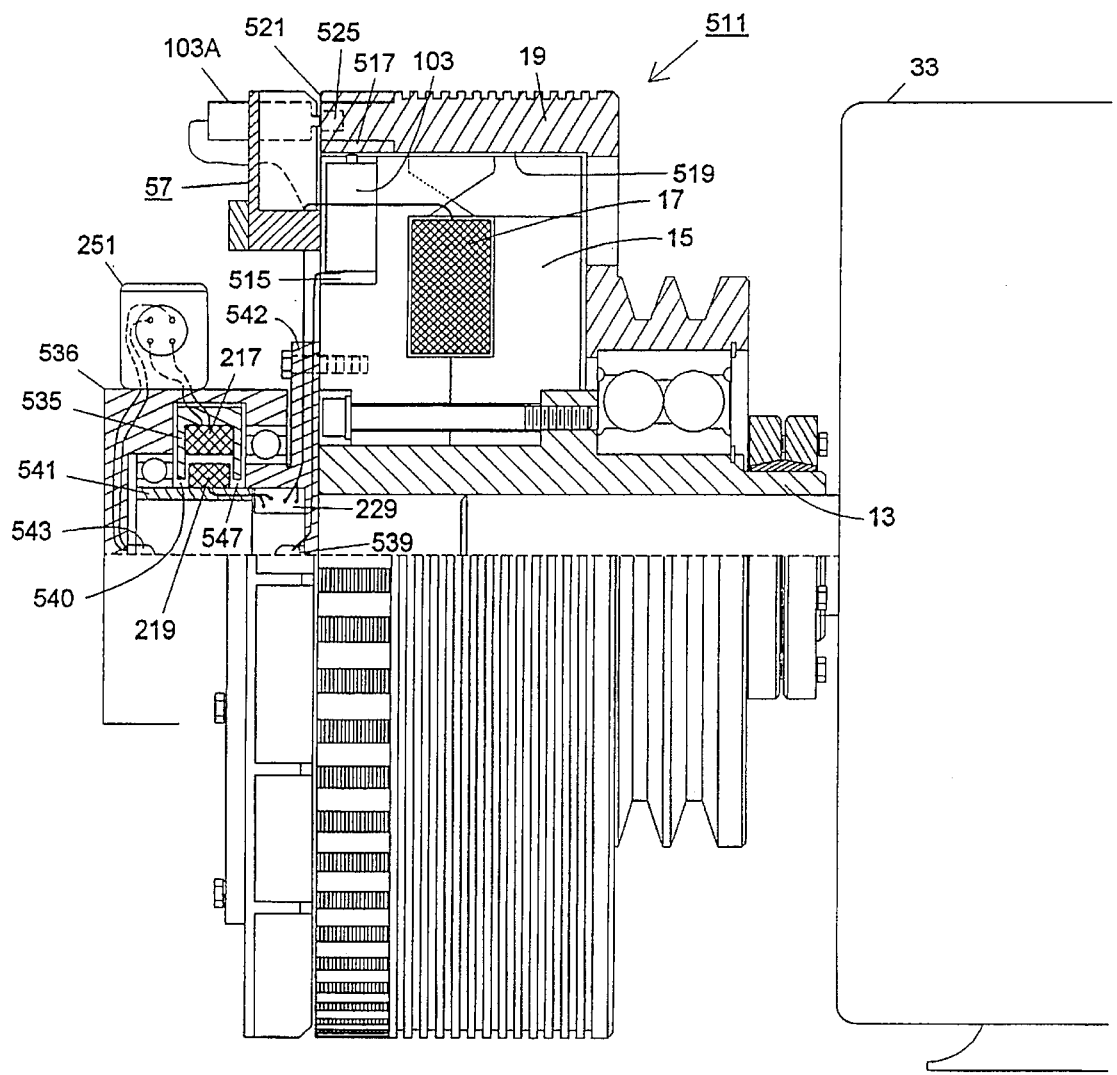
FIG. 20 is a partial cross-sectional side view of a drive, in accordance with another embodiment, showing a speed sensor mounted on a rotating part.

In FIG. 20, there is shown a drive 511 with a speed sensor 103 mounted to a rotating part. The speed sensor 103 is used to monitor the speed of the output member (such as the armature 19 and sheave assembly shown in FIG. 20). Traditionally, a speed sensor 103 has been mounted to a stationary or non-rotating part, such as is shown in FIG. 1. In such an arrangement, the speed sensor is stationary. Electrical wires directly connect the speed sensor to a control circuit 514 or to a monitoring circuit. The control circuit is typically mounted off of the drive and on a stationary platform.

However, in the drive 511 shown in FIG. 20, the speed sensor 103 is mounted to a rotating part. Thus, the speed sensor 103 can be mounted to either the armature 19 or to the pole pieces 15. When the speed sensor is mounted to one of the rotating members, notches are formed in the other rotating member. Thus, the differential speed between the two rotating portions (the armature and the pole pieces) of the drive is sensed.

For example, as shown in FIG. 20, the speed sensor 103 can be mounted in a cavity 515 in one of the pole pieces 15. Notches 517 are machined into the inside surface 519 of the armature 19 so as to form peaks and grooves as described above with reference to FIG. 2. The notches extend for a short distance from the end 521 of the armature. Alternatively, the speed sensor 103A can be mounted onto the fan 57, as shown by dashed lines in FIG. 20. Notches 525 are machined into the end 521 of the armature so as to form peaks and grooves as described with reference to FIG. 2. Wherever the speed sensor is located, the sensor head 523 of the speed sensor is located adjacent to the notches. A gap separates the sensor head from the notches so as to avoid direct contact.

Figure 21:
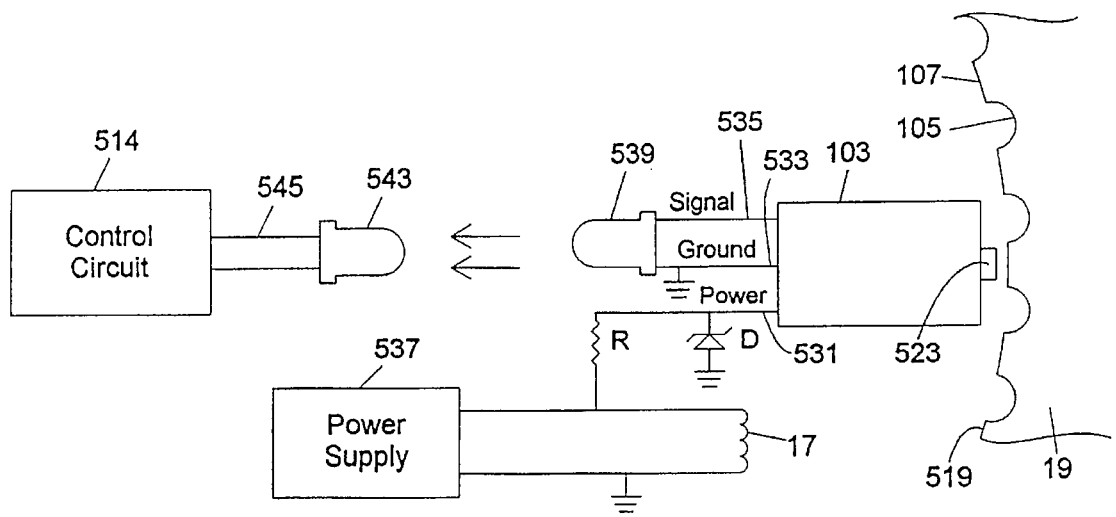
FIG. 21 is an electrical schematic diagram of the speed sensor arrangement of FIG. 20.

In the preferred embodiment, the speed sensor 103 is a magnetic variable reluctance sensor, which is conventional and commercially available. Referring to FIG. 21, the electrical connections of the speed sensor will be described. The speed sensor 103 is a three wire device, having the following wires: power 531, ground 533 and signal 535. The power and ground wires 531, 533 are connected to a power supply 537, in parallel with the eddy current coil 17. A dropping resistor R is placed in series with the power wire 531 and a zenor diode D is connected across the power and ground wires 531, 533. A voltage regulator could be used in place of the resistor and diode. The signal wire 535 is connected to a light source 539, such as a light emitting diode (LED). The LED is connected between the signal wire 535 and the ground wire 533.

Referring back to FIG. 20, the LED is located on a hollow end shaft 541. The rotatable end shaft 541 has a flange 542 which is coupled to the fan 57, the pole pieces 15 and the hub 13. Thus, the LED 539 rotates in unison with the speed sensor 103 and its power supply. As shown in FIG. 20, the power supply is a rotating coil 219 of a rotary transformer, which has been previously discussed with reference to FIG. 11. The cross-sectional shape of magnetically susceptible elements of FIG. 20 are different. The stationary member 535 is shaped like an inverted "U", creating air gaps 540, 547 between the stationary member and the end shaft 541.

The LED 539 is preferably located along the rotative axis of the drive. A light sensor 543 is located on a stationary housing 536, preferably along the same axis of rotation as the light source. In the preferred embodiment, the light sensor 543 is a photo transistor. Wires extend from the light sensor 543 to a junction box 251, where connections are made to the appropriate circuit. An air gap separates the LED 539 from the light sensor 543. The stationary housing 536 is anchored to a fixed platform in the manner previously discussed with reference to the other embodiments. Thus, the stationary housing 536 does not rotate.

In operation, the speed sensor 103 generates electrical pulses based on the differential speed between the armature and the pole pieces. Referring to FIG. 21, a pulse is generated whenever the sensor head 523 passes adjacent to a peak 107, followed by a notch 105 in the armature 19. The pulses generated by the speed sensor 103 are used to directly drive the LED 539. The LED 539 thus produces pulses of light in direct proportion to the electrical pulses produced by the speed sensor. Alternatively, the light source can produce a greater number or fewer number of pulses in proportion to each speed sensor pulse.

The light pulses are received by the photo transistor 543. The photo transistor converts the light pulses to electrical pulses, which are then transmitted to the control circuit 514 by wires 545.

The frequency of the pulses produced by the speed sensor 103 is proportional to the differential speed between the pole pieces 15 and the armature 19. If the armature 19 is not rotating at all, then the differential speed will be at a maximum speed (because the pole pieces are rotating at the same speed as the motor shaft and the pulse frequency will be at a maximum frequency. If the armature is rotating at the same speed as the pole pieces, then the differential speed is 0 and the pulse frequency is 0. Intermediate armature speeds will produce intermediate pulse frequencies.

The speed sensor arrangement shown in FIG. 20 can be used with any power supply. For example, the rotary transformer shown in FIG. 11 can be used as the power supply. Specifically, the power supply includes the rotating coil 219 and bridge rectifier 229. The speed sensor 103 is connected to the output of the bridge rectifier 229. Alternatively, the power supply can include the coil 319 and bridge rectifier 329 of FIG. 13. Still another way to power the speed sensor is to connect the speed sensor to the coupling 417 of FIG. 14.

Figure 22:
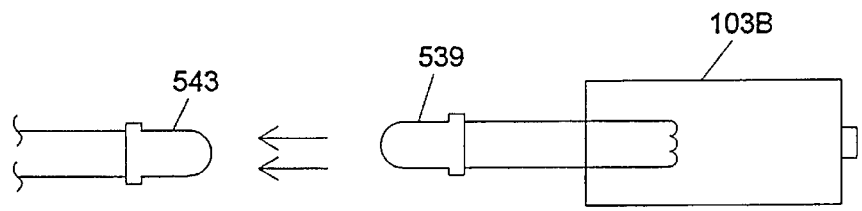
FIG. 22 is an electrical schematic diagram of another embodiment oft he speed sensor arrangement of FIG. 20.

The speed sensor 103 shown in FIG. 21 is a three wire speed sensor. Such a speed sensor produces digital pulses. Other types of speed sensors can be used. For example, a two wire, self powered, speed sensor 103B can be used, as shown in FIG. 22. The speed sensor is not connected to the power supply. The speed sensor produces sine wave pulses which pulses drive the LED 539.

Figure 24:
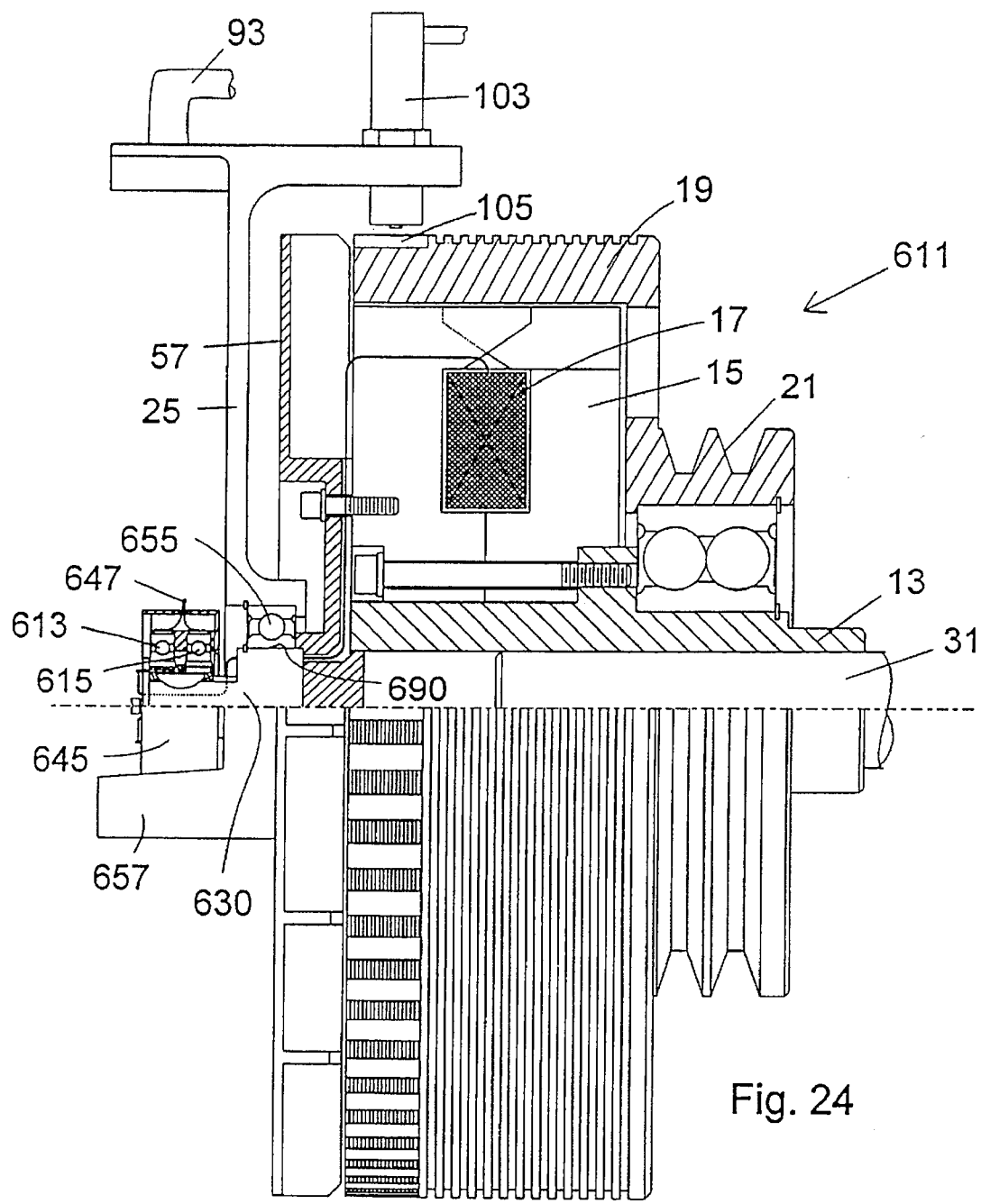
FIG. 24 is a partial cross-sectional side view of the drive of the present invention, in accordance with a further embodiment showing a bearing power coupling for providing current to the rotating coil.
Figure 25:
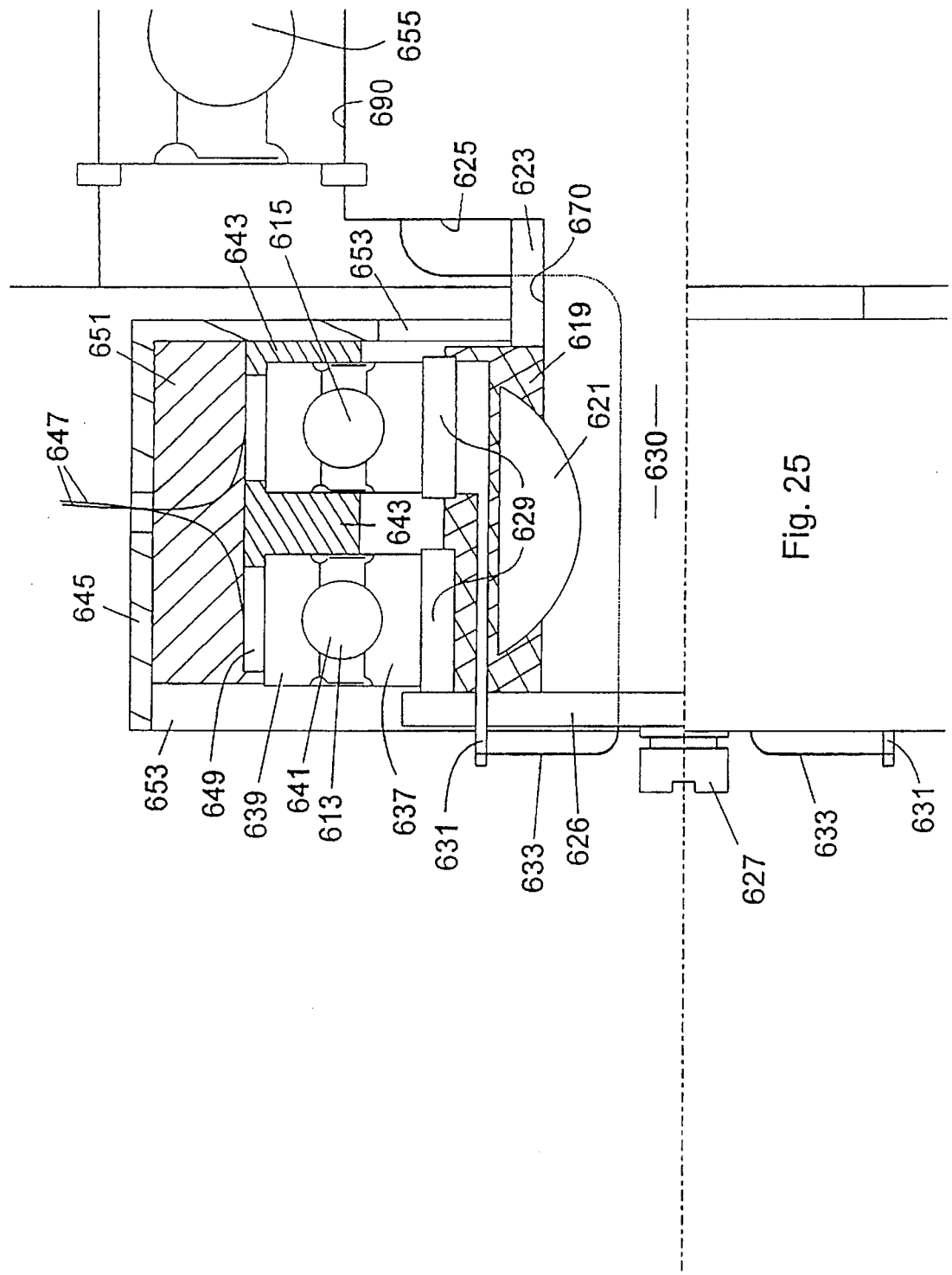
FIG. 25 is a close up cross-sectional view of a portion of the bearing power coupling of FIG. 24.
Figure 26:
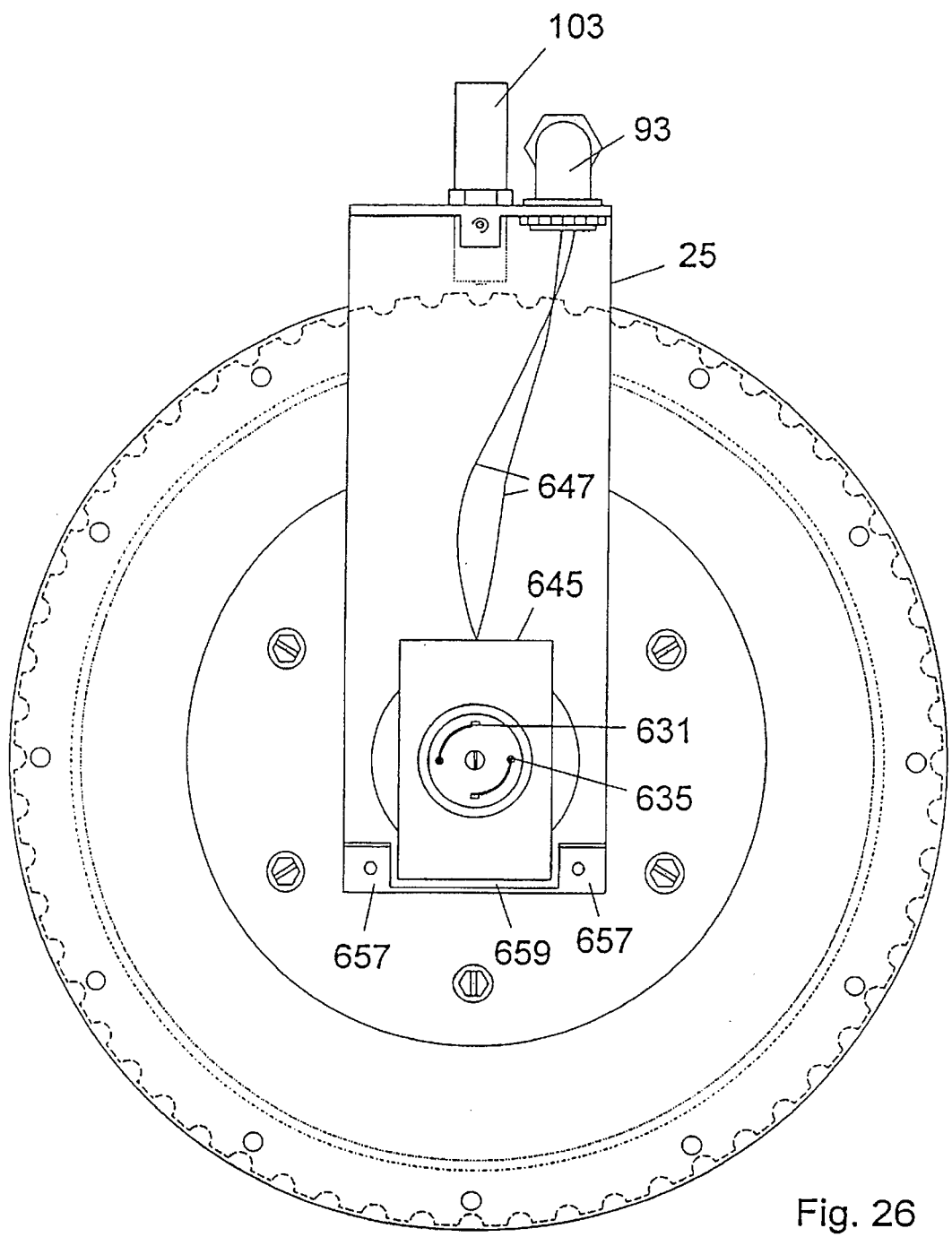
FIG. 26 is a view showing the outer end of the drive of FIG. 24.

In FIGS. 24–26 a drive 611 in accordance with another embodiment is shown. This embodiment uses a bearing power coupling for providing current to the rotating coil 17. Electrical current is provided from a stationary power supply to the rotating coil directly through one or more bearings 613, 615. Thus, the drive is brushless. Because there are no brushes, routine maintenance on the drives (which is usually for replacing brushes) is reduced.

Furthermore, the use of a stub shaft 630 at one end of the drive (which is opposite the motor shaft 31 in FIG. 24) allows sizing of the power coupling member independently of the hub. One size (or horsepower) drive will require a hub 13 of a first diameter, while a larger horsepower drive will typically require a larger diameter hub. But, the stub shaft 630 need not change size; the same size stub shaft can be used on both the small and larger drives. This allows the same bearing to be used. In addition, a relatively small sized bearing can be used because the bearings 613, 615 need not encircle the hub 13. These factors make the drive 611 more economical to manufacture.

The bearing power coupling will be now described more specifically. Referring to FIG. 24, the stub shaft 630 is coupled to the fan 57 in manner that is similar to the slip ring shaft 63 of FIG. 1 being coupled to the fan. Referring to FIG. 25, the stub shaft 630 has first and second outer cylindrical surfaces 670, 690. The first outer surface 670 is located at the outer end of the shaft 630. A non-conductive ring 619 is located on the first outer surface 670. A key 621 extends between the non-conductive ring 619 and the shaft 630, in order to rotate the ring 619 in unison with the shaft. The ring is positioned on the shaft first outer surface 670 by a spacer 623 that abuts a shoulder 625. The spacer 623 contacts one end of the ring 619, while an end plate 626 contacts the other end of the ring. The plate 626 is secured to the outer end of the shaft by a threaded fastener 627. Thus, the ring 619 is coupled to the shaft 630 by the key 621, the spacer 623, the shoulder 625, and the plate 626.

A pair of conductors 629 are located on the outer surface of the ring 619. The conductors 629 are bonded to the ring 619 so as to rotate in unison therewith. The conductors 629 can be rings that extend around the non-conductive ring 619. Alternatively, the conductors 629 can be short strips that do not fully extend around the circumference of the non-conductive ring 619. The conductors 629 are spaced apart from each other so as to avoid contact with each other. The conductors 629 can be bonded to or press fit on the ring 619. Each conductor has a contact 631 that emerges from the outer end of the ring 619 and the plate 626. Wires 633 are connected to the contacts 631, which wires are connected to the drive coil 17 so as to provide a drive coil circuit. The wires 633 extend through channels 635 (see FIG. 26) in the shaft 630 or alternatively in the ring 619.

Mounted on each conductor 629 is a conductive bearing 613 or 615. Each bearing has an inner raceway 637, an outer raceway 639, and plural rollers 641 (for example, balls, rollers or needles) all of which are electrically conductive. To enhance conductivity through the bearings 613, 615, a conductive grease or lubricant 640 is located around the rollers 641 and between the inner and outer raceways 637, 639. The conductive grease is conventional and commercially available. Conductivity of the grease is obtained by adding a conductive material such as carbon or silver to a lubricant. The grease 640 is in contact with the inner and outer raceways 637, 639 and the rollers 641. Besides being a lubricant to reduce wear, the grease coats the rollers 641 and provides continuous electrical contact between the inner and outer raceways 637, 639.

The inner raceway 637 is press fit onto the respective conductor 629. A non-conductive spacer 643 (for example, an annular printed circuit board) is located between both outer raceways 639. In addition, if the housing 645 is conductive, then a non-conductive spacer 643 is provided between an outer raceway and the housing 645. A stationary wire 647 is electrically connected to each outer raceway. In the preferred embodiment, a band 649 is clamped or pressed fit to the outside diameter of each outer raceway and end of each wire is interposed between the respective band 649 and the respective outer raceway 639. Alternatively, the wires 647 can be bonded to the outer raceways 639 or to the bands 649. The wires 647 extend to a conduit 93 (see FIG. 26), which is anchored to a stationary platform.

The wires 647 are connected to a voltage source, which preferably provides a variable voltage.

The housing 645 is located around the bearings 613, 615. A potting compound 651 is located in the cavity between the housing 645 and the outer raceways 639. The potting compound 651 both seals the electrical connection of the wires 647 to the bearings and provides structural support for the housing on the bearings. Use of the potting compound makes assembly of the housing onto the bearings simpler because the manufacturing tolerances can be wide. The housing has openings 653 for receiving the shaft 630.

Referring to FIG. 24, another bearing 655 is located on the second outer surface 690 of the shaft 630. An extension member 25 is coupled to the outer raceway of the bearing 655 and extends from the bearing to a radial distance beyond the armature. A speed sensor 103 is positioned adjacent to the armature 19 by the extension member 25.

The housing 645 and the outer raceways 639 are prevented from rotating with the shaft 630 by the extension member 25. The extension member itself is prevented from rotating by the conduit 93 (see FIG. 26). As shown in FIG. 26, the extension member has two posts 657 that extend axially. The posts form a notch 659, which receives a portion of the housing 645. Thus, the housing is prevented from rotating by the two posts.

In operation, the motor shaft 31 rotates the hub 13, the coil 17, the fan 57, the shaft 630 and the inner raceways 637 of the bearings 613, 615. To rotate the armature 19 and the sheaves 21, the coil is energized. Electrical current is applied to the drive coil 17 from the stationary wires 647, to the outer raceways 639 of the bearings, to the balls 641 which are in electrical contact with the outer raceways, to the inner raceways 637 which are in electrical contact with the balls, to the wires 633 and to the drive coil 17. Of course, a complete circuit is made, so that current enters the drive coil through one bearing and exits through the other bearing (for dc). Alternating current (ac) could also be used. However, a rectifier is connected between the bearings 613, 615 and the drive coil in order to rectify the ac current. To vary the speed of the sheaves, the current through the bearings 613, 615 is varied. The variation in current is done by a controller located off of the drive.

The bearings conduct current, even if they contain a non-conductive lubricant such as grease. However, a conductive lubricant is preferred so as to extend the life of the bearings.

Figure 27:
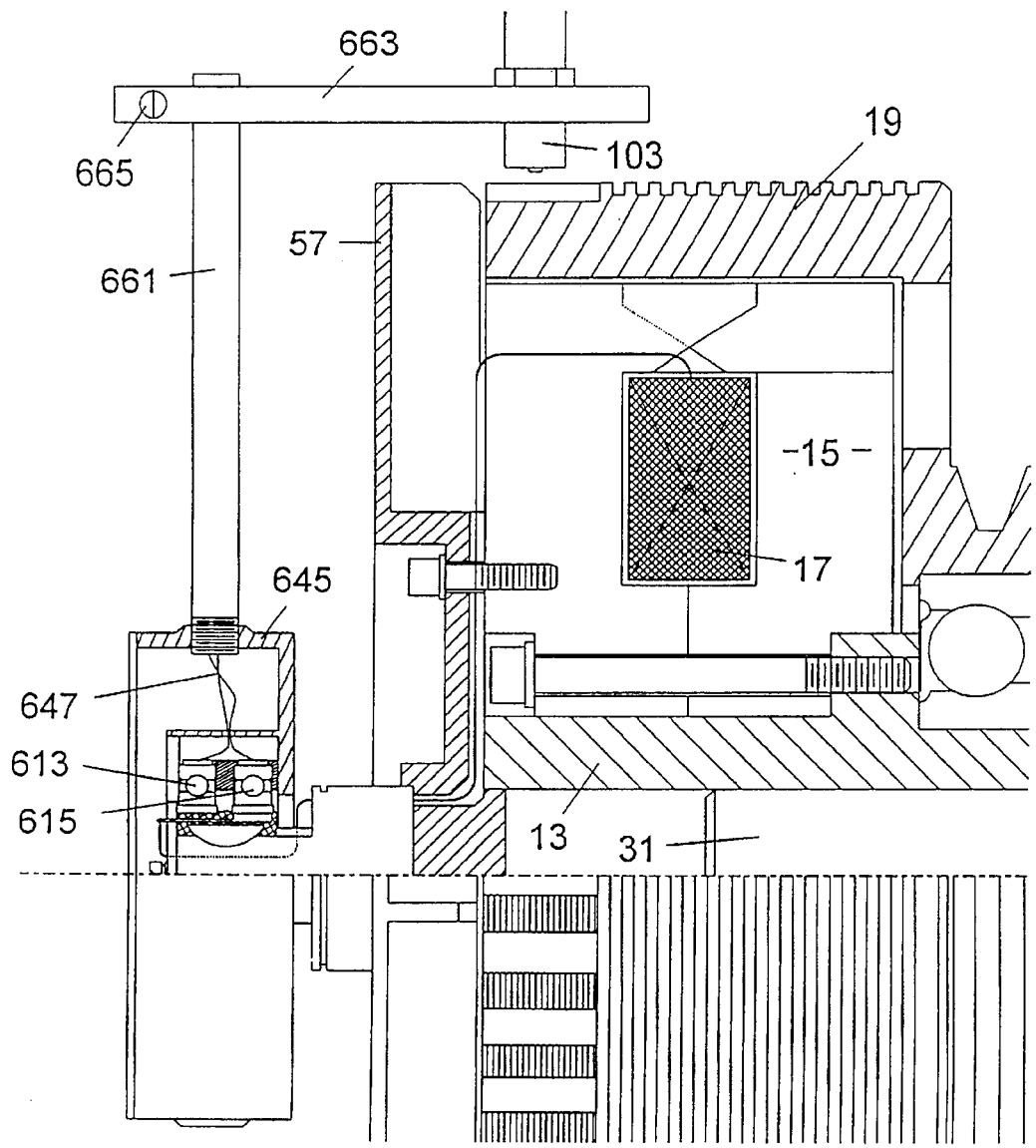
FIG. 27 is a partial cross-sectional close up view of the drive, showing another embodiment of the bearing power coupling.

In FIG. 27, there is shown another embodiment of the bearing power coupling. In this embodiment, the extension member 661 for the speed sensor 103 is mounted to the shaft 630 by way of the bearings 613, 615. The extension member 661 is a conduit having one end coupled to the housing 645. The stationary wires 647 traverse through the conduit 641. The other end of the conduit 661 (which may have one or more bends therein) is coupled to a stationary object. The speed sensor 103 is coupled to the conduit by an arm 663. The arm 663 is clamped to the conduit 661 by a screw 665. The screw 665 can be loosened to allow the arm to be moved along the conduit. This permits radial adjustment of the speed sensor 103 relative to the shaft 630.

Figure 28:
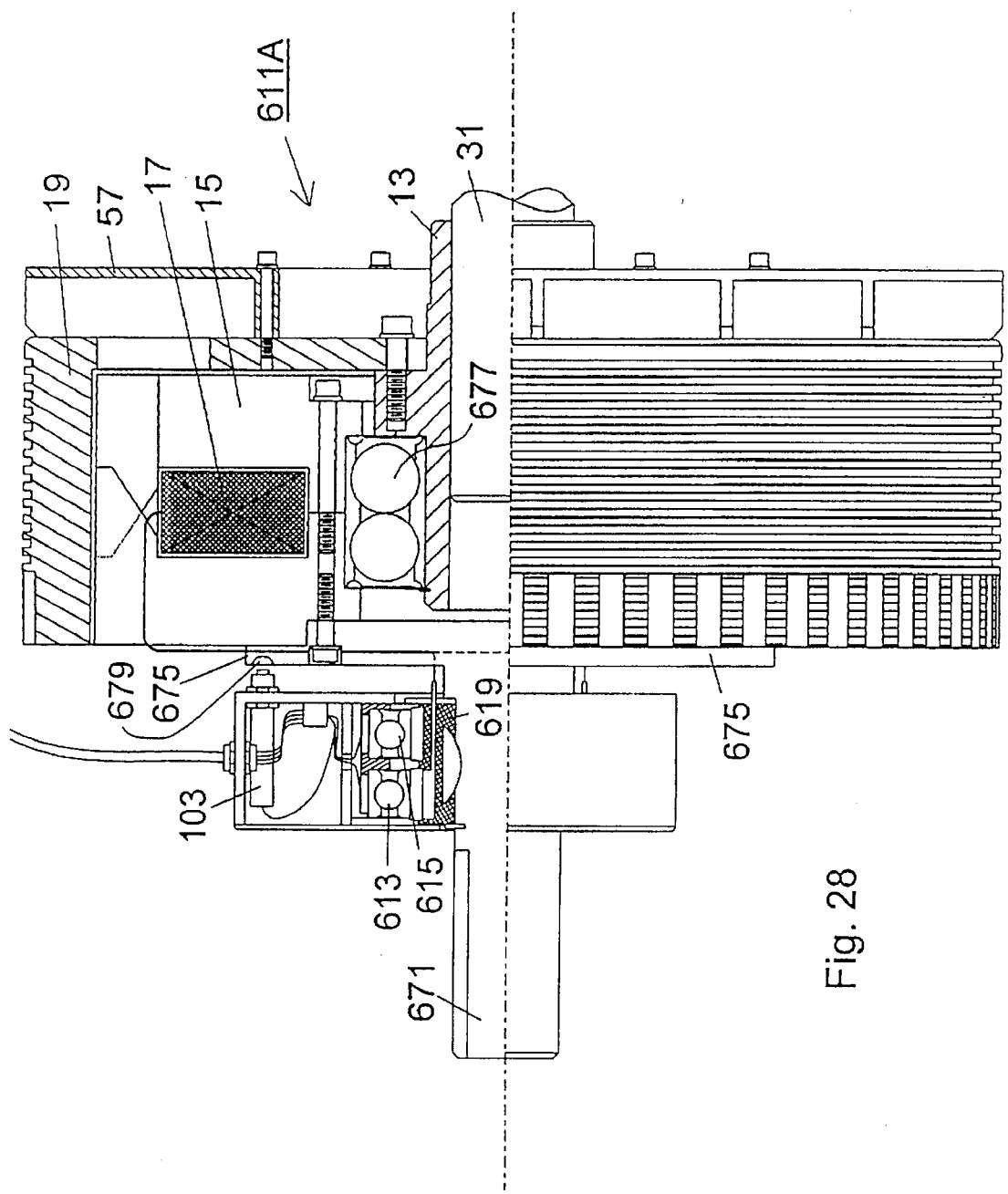
FIG. 28 is a partial cross-sectional view of the drive, showing still another embodiment of bearing power coupling.

In FIG. 28, there is shown still another embodiment of the bearing power coupling. In this embodiment, an output shall 671 is provided in lieu of sheaves. The drive 611A of FIG. 28 is a shaft-in shaft-out drive.

The output shaft 671, which rotates in unison with the drive coil 17, supports the two bearings 613, 615 that provide electrical current to the drive coil. The wires 633 that are connected to the inner raceways of the bearings need not go through the shaft 671 or ring 619. The wires 633 traverse a channel in a radial flange 675 that is integral to the shaft.

The armature 19 is bolted to the hub 13, while the fan 57 is bolted to the armature. The pole pieces 15 are mounted to the hub 13 by bearings 677. The output shaft 671 is bolted to the pole pieces 15 by way of the flange 675. The flange 675 has holes 679 that are spaced apart and arranged in a circular pattern of constant radius from the axis of rotation of the shaft. The holes 679 form teeth that are similar to the teeth 105 of FIG. 1, so as to form a digital pattern for speed sensing purposes. The teeth are thus on an end of the drive instead of being around an outside diameter of the drive. The speed sensor 103 is coupled to the housing so as to be adjacent to the teeth.

Figure 29:
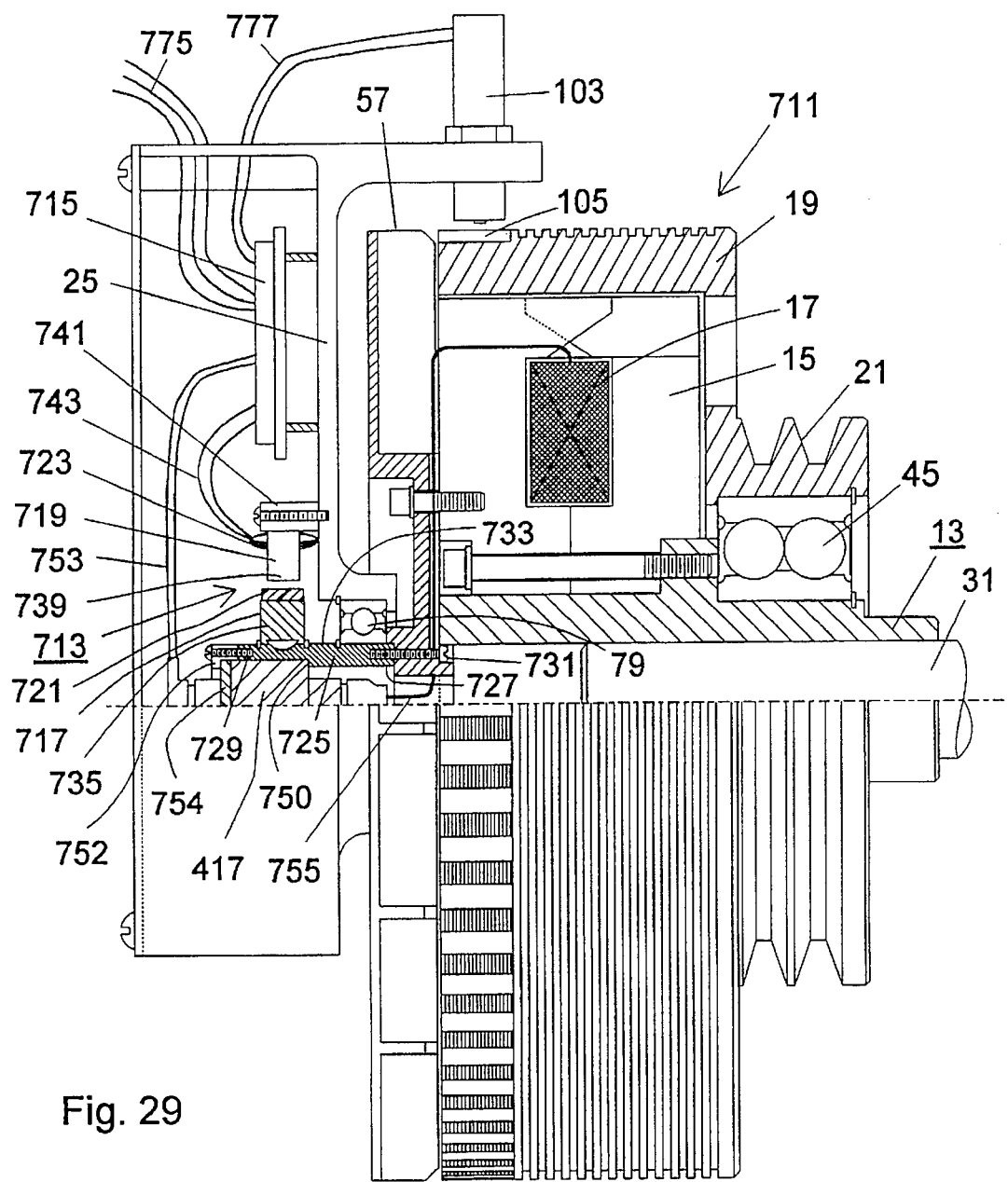
FIG. 29 is a partial cross-sectional view of the present invention, in accordance with a preferred embodiment, showing a self contained eddy current drive that provides its own operating power to energize the eddy current coil.
Figure 32:
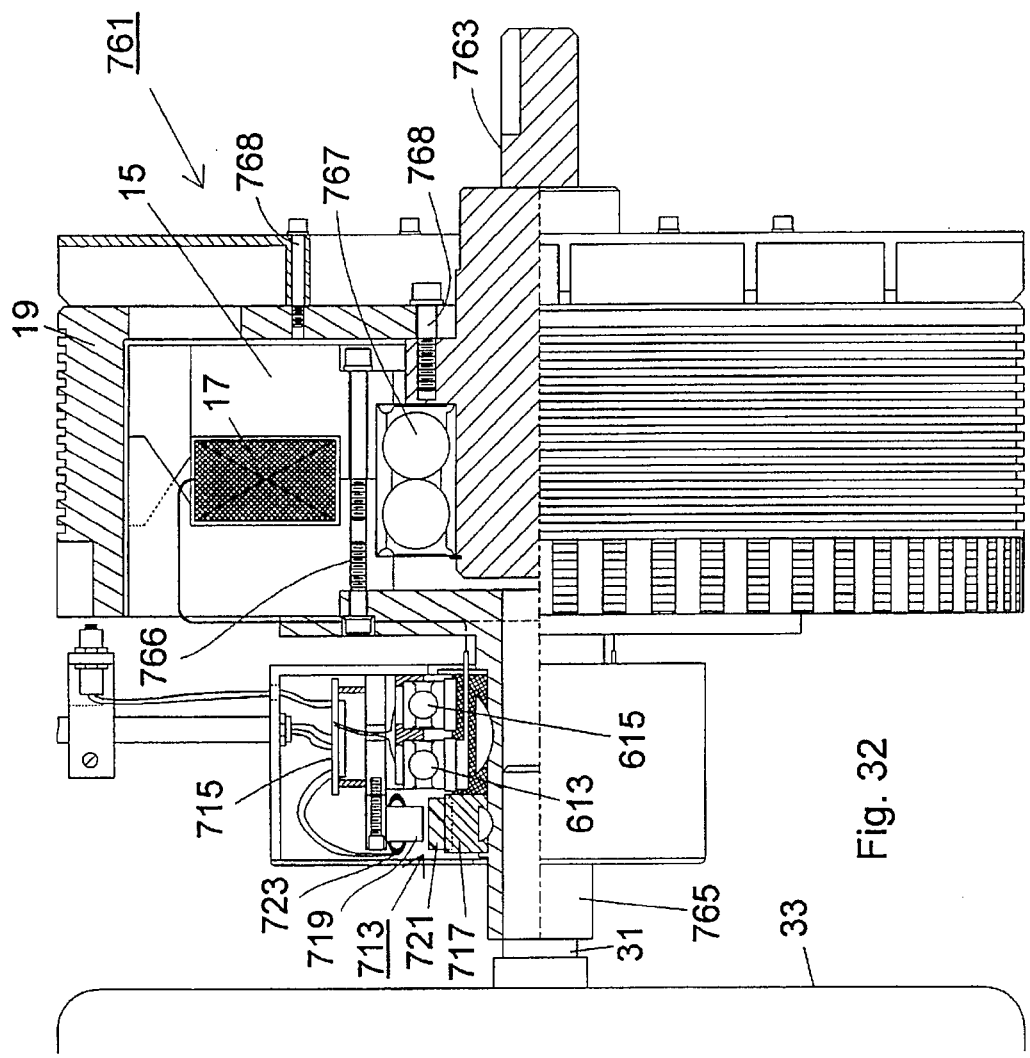
FIG. 32 is a schematic partial cross-sectional view of the self contained eddy current drive, in accordance with another embodiment.

FIGS. 29 and 32 show eddy current drives 711, 761 that have a self-contained power supply to energize the coil 17 in the electromagnet. The drive uses the rotary power of the motor 33 to energize the coil 17. The motor can be an electric motor or it can be a non-electric motor, such as an internal combustion engine. More specifically, some of the rotary power of the motor shaft 31 is converted into electric current by a generator 713 that is a component of the drive. This electric current is then applied to the coil 17.

The speed of the output of the drive can be regulated by varying the generated electric current that is provided to the coil 17. A controller 715 is provided to regulate the current provided to the coil 17. Preferably, the controller 715 is mounted on the drive, so as to make the drive self-contained.

Referring now to FIG. 29, the drive 711 is similar to the drive 11 of FIG. 1, in that both drives have a hub 13, pole pieces 15, and a coil 17. The hub 13 has an outer end portion and an inner end portion. The inner end portion is mounted or coupled to the motor shaft 31 so that the hub rotates in unison therewith. The drive 711 also has an armature 19 and an output portion in the form of sheaves 21. The sheaves receive belts, which belts are coupled to a load (such as load sheaves). The sheaves are rotatably coupled to the hub by way of bearings 45. A fan 57 is coupled to the outermost one of the pole pieces.

The generator 713 is shown as being located at the outermost end of the drive 711. The generator 713 has a rotor 717 and a stator 719. The rotor 717 rotates with the coil 17. The stator 719 remains stationary during the operation of the drive. The generator provides a magnetic field and coils that move through the magnetic field so as to be subjected to changes in the magnetic field. In the embodiment shown in FIG. 29, the rotor has permanent magnets 721 coupled thereto and the stator has one or more coils 723 of conductive wire.

The rotor 717 is coupled to a sleeve 725, which sleeve is in turn coupled to the fan 57. Specifically, the sleeve 725 has an inner end 727 and an outer end 729. The inner end abuts against the fan 57 and is coupled thereto by bolts 731. The sleeve 725 has an outside surface 733.

Figure 30:
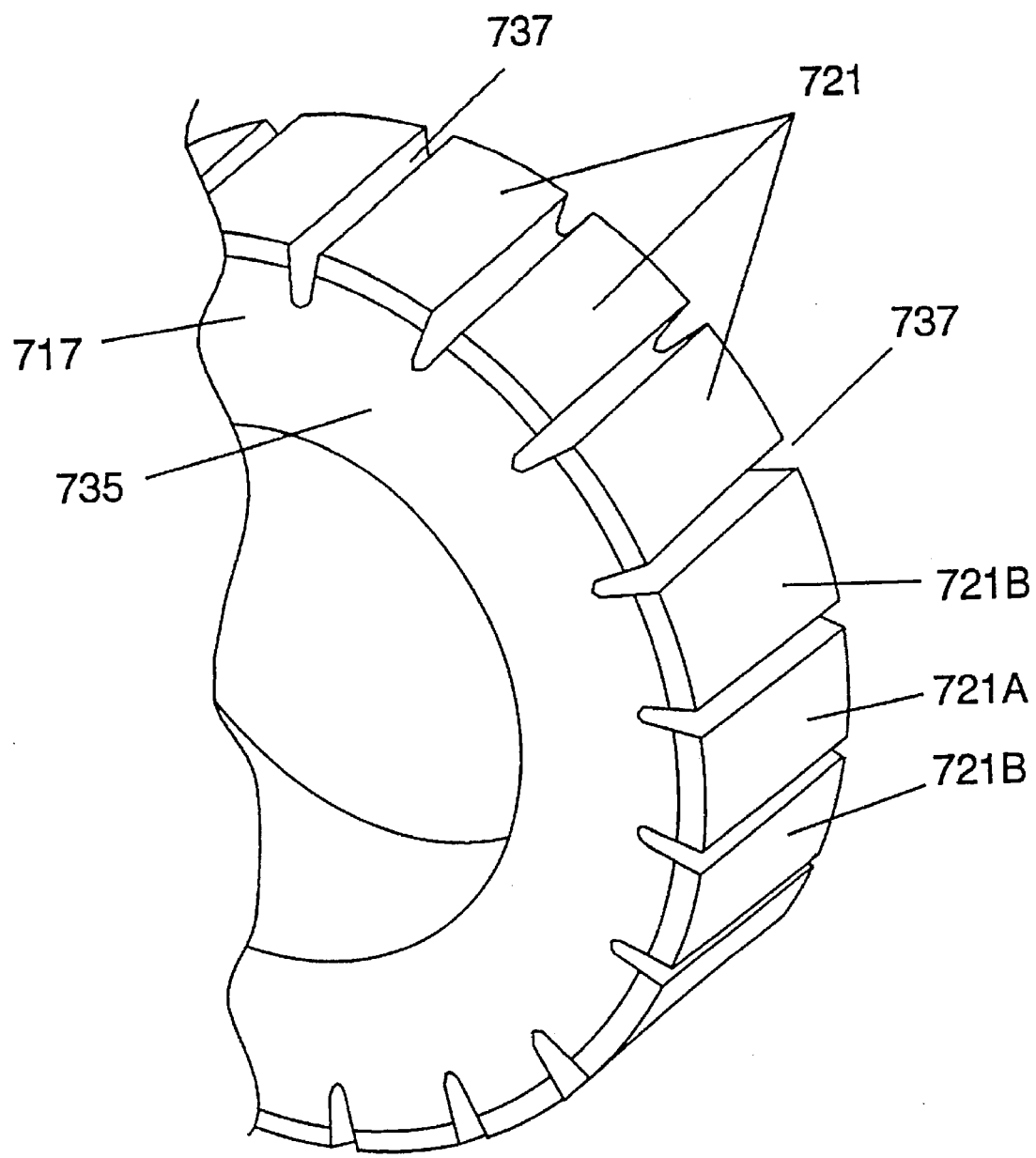
FIG. 30 is an isometric view of a portion of the rotor of the drive of FIG. 29.

The rotor 717 has an annular support 735 that is made up of a nonmagnetic material. The support 735 is mounted onto the outside surface 733 of the sleeve 725. The support 735 is coupled to the sleeve by way of a key and snap rings such that the rotor 717 rotates in unison with the sleeve 725. The support 735 projects radially outward from the sleeve. Mounted on the outside radius of the support 735 is a set of permanent magnets 721 which are conventional and commercially available. Referring to FIG. 30, there is shown an isometric view of a portion of the rotor 717. Each individual magnet 721 is physically separated from its adjacent magnets by a gap or space 737. Adjacent magnets have opposite polarities so that one magnet 721A has its north pole oriented in one direction while the adjacent magnets 721B have their north poles oriented in the opposite direction.

Referring back to FIG. 29, the stator 719 is coupled to the sleeve 725 by way of a bracket 25. The bracket 25 is mounted on the sleeve 725 by a bearing 79. The bracket 25 is anchored to a nonrotating point by way of a conduit 93 (see FIG. 1) or some other type of anchor. Thus, while the sleeve 725 rotates, the bracket 25 and stator 719 do not rotate.

The stator 719 is made up of plural poles 739 that extend radially inward from a ring 741. Wrapped around each pole is a winding 723 of conductive wire. The ring 741 of the stator is bolted to the bracket 25.

The drive 711 also has a controller 715 that is coupled to the bracket 25. The stator 719 has wires 743 that connect to the controller 715. The controller 715 rectifies the current from the windings 723 so as to convert the current to dc. In addition, the controller 715 regulates the amount of current provided to the coil 17 so as to regulate the speed of the output sheaves 21 of the drive 711.

Figure 31:
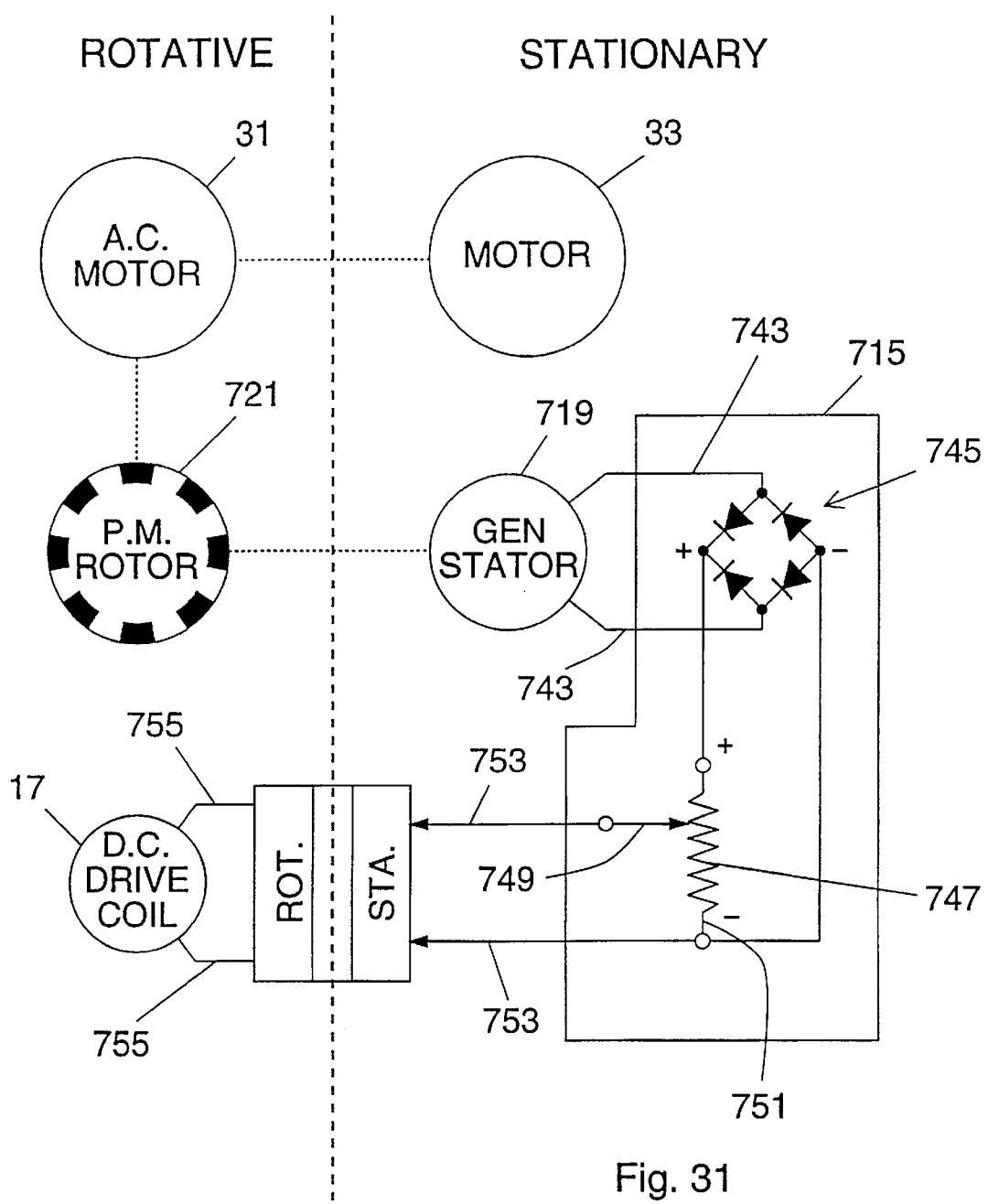
FIG. 31 is an electric schematic diagram of the eddy current drive of FIG. 29.

Referring to FIG. 31, there is shown a schematic diagram of the components of the drive 711 of FIG. 29 (and also the drive 761 of FIG. 32). In general, the components are designated as rotative (shown on the left of side FIG. 31) and stationary (shown on the right side of FIG. 31). The motor 33 is stationary, being mounted to a floor, cabinet, or other structure. The motor of course rotates the motor shaft 31. The generator rotor 717, which contains the permanent magnets 721, rotates at the same speed as the motor shaft 31. The rotor 717 provides a moving magnetic field, portions of which are intercepted by the windings 723 of the stator 719. The stator has wires 743 that connect the stator windings 723 to a rectifier 745. The rectifier is in the controller 715 (FIG. 29). The rectifier 745 is a bridge of diodes. The output of the rectifier 745, which is dc, is applied to a regulator 747, which is also part of the controller 715. In FIG. 31, the regulator 747 is shown as being a potentiometer. The ends of the potentiometer 747 are connected across the output of the rectifier 745. The electromagnetic coil 17 is connected across an adjustable lead, or wiper 749, of the potentiometer. Thus, a resistance is provided in series with the electromagnet coil 17. The position of the wiper 749 is set to provide the desired speed. For example, if the wiper 749 is moved so as to reduce the resistance between the rectifier 745 and coil 17, then the coil is provided with more current, and the output speed (for example, the speed of the armature 19 and the sheaves 21) of the drive increases. Conversely, if the wiper is moved so as to increase the resistance between the rectifier and the coil, then the coil is energized less and the output speed to the drive decreases.

As an alternative to the potentiometer 747 arrangement shown in FIG. 31, the negative end 751 of the potentiometer 747 can be disconnected from the rectifier and the coil. This would eliminate a shunt resistance across the coil 17 and present only a series resistance.

In the preferred embodiment, the stator 719 is provided with the coils and poles. Thus, the electrical power provided by the stator 719 must be provided to the rotating electromagnetic coil 17. This is done by utilizing a rotary coupling. In FIG. 29, the type of rotary coupling shown is a liquid conductor coupler 417, which is also shown in FIGS. 14 and 15. As shown in FIG. 29, the liquid conductor coupler 417 is located inside of the sleeve 725, at the outer end of the sleeve. The coupler 417 is retained inside of the sleeve 725 by a shoulder 750 on the inside of the sleeve and by an annular lip 752. The lip 752 is bolted to the outer end 729 of the sleeve. A rubber washer 754 is interposed between the lip 752 and the outer end of the coupler 417. The inner end of the coupler abuts against the shoulder 750. Wires 753 extend from the controller 715 to a stationary portion (the outer end) of the coupler 417. The inner end of the coupler 417 rotates with the sleeve 725. Wires 755 extend from this inner end, through an opening in the fan 57 to the electromagnetic coil 17.

To change the coupler 417, the lip 752 is unbolted from the sleeve 725. The washer 754 and coupler are then removed from the sleeve 725. A sufficient length of wire 755 is provided so as to allow complete removal of the coupler. The wires 753 and 755 are disconnected from the coupler. The process is reversed with a new coupler.

In FIG. 32, there is shown another embodiment of the self-contained drive 761. The output of this drive, instead of being sheaves, is an output shaft 763. This embodiment is referred to as a shaft-in shaft-out version. (FIG. 32 is not drawn to scale, but is a schematic diagram.) The "shaft-in" is the motor shaft 31, while the "shaft-out" is the output shaft 763, which is connected to a load.

A hub 765 is provided, which hub mounts onto the motor shaft 31. The generator 713 is similar to that described above with respect to FIG. 29. The rotor 717, with its permanent magnets 721, is coupled to the hub 765, while the stator 719 which has windings 723 of wire, is coupled to the hub by way of bearings 613, 615. The output of the stator 719 is connected to a controller 715. The rotary coupler that provides electrical current from the controller 715 to the coil 17 are the bearings 613, 615, which are shown in FIG. 28.

The electromagnetic coil 17 and pole pieces 15 are coupled to the hub 765 by way of bolts 766. The pole pieces 15 are also coupled by way of bearings 767 to the output shaft 763. The armature 19 and fan 57 are directly coupled to the output shaft 763 by bolts 768.

Alteratively, the hub 765 could be extended outwardly with respect to the motor, so that the pole pieces 15 bear more fully on the hub and so that the armature 19 and output shaft 763 bear on the hub by way of bearings, as shown in FIG. 18.

Although the drives 711 and 761 of FIGS. 29 and 32 have been described with specific rotary couplings (the liquid conductor coupler 417 of FIG. 29 and the bearings 613, 615 of FIG. 32), other types of rotary couplings can be used. For example, brushes and slip rings can used. These are shown in FIG. 1. Also, an inductive rotary coupling, such as is shown in FIGS. 11 and 13 can used.

Although the drives have been described as having permanent magnets 721 on the rotor 717, the magnet can be located on the stator 719, while the coil windings 723 are located on the rotor. Such a configuration would eliminate the need for a rotary coupling because the coil windings 723 would rotate in unison with the electromagnet coil 17. In this type of configuration, the controller 715 would be located on a part of the drive that rotates in unison with the coil 17.

The magnetic field, whether it be produced by the rotor or the stator, can be produced by permanent magnets or by electromagnets. The use of permanent magnets simplifies the construction and the operation of the drives. However, the use of electromagnets may be economical in some applications. If electromagnets are used, then field windings are provided. In addition, an excitation current for the field windings is provided.

The generator can be of a variety of types, such as a dc generator or an ac generator. The generator described above with respect to FIGS. 29 and 32 is an ac generator. However, if a dc generator is used, a rectifier need not be used. Also, in the case of an ac generator, the generator can be single phase or three phase. Furtherstill, a magneto type of design can be utilized, wherein a coil is rotated through a magnetic field (which field is produced, for example, by a horseshoe shaped magnet).

Figure 31A:
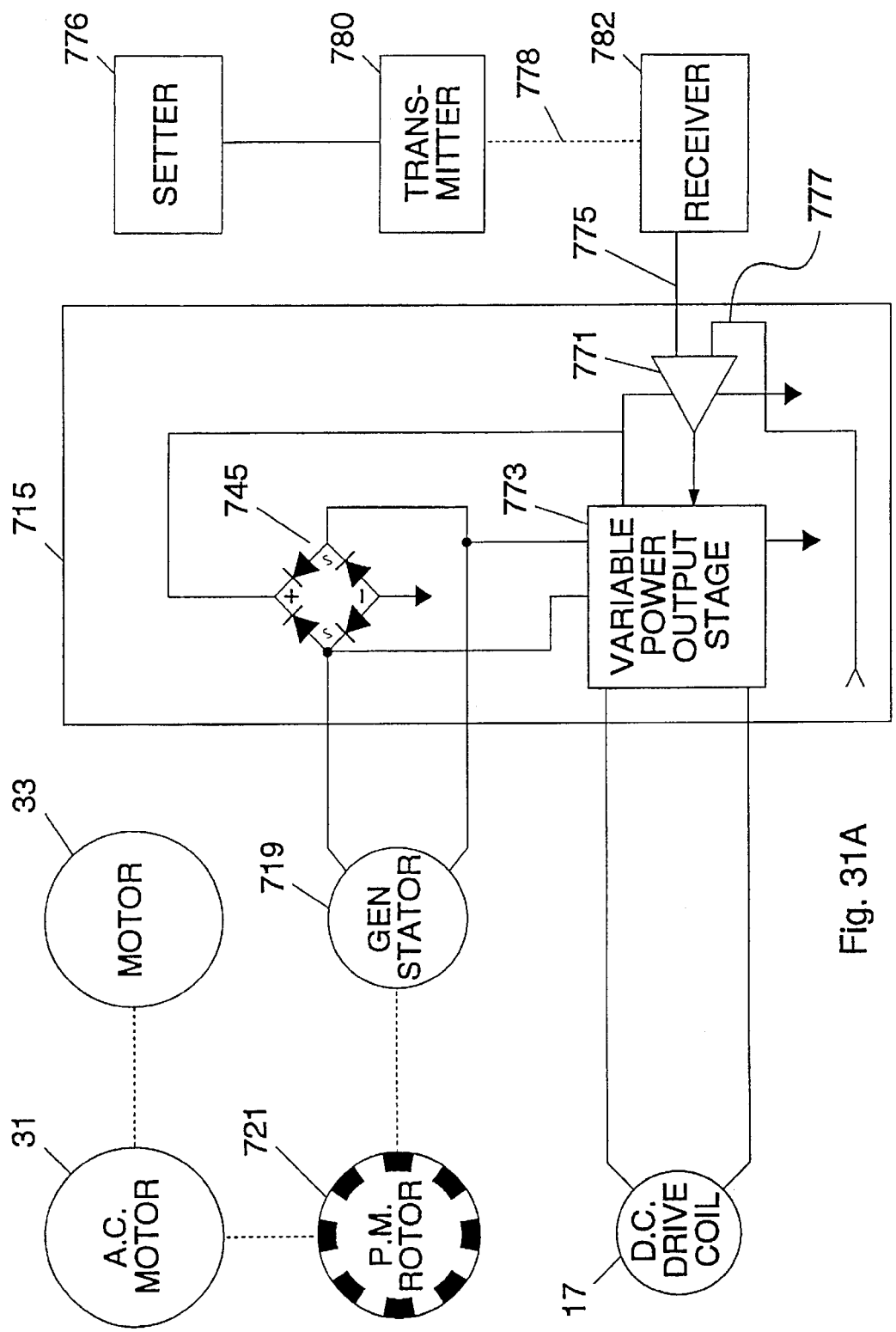
FIG. 31A is an electrical schematic diagram of a coil regulator, in accordance with another embodiment.

Although the controller 715 has been described as having a potentiometer for a regulator, other types can be used. For example, referring to FIG. 31A, a desired speed signal can provided over wires 775, which speed signal can vary over time. The speed signal can be produced by a remote source or setter 776 such as a transducer (for example, a thermostat in an air handler unit) or an instrument panel. The desired speed signal is communicated to the drive over a channel 778. The channel can be wires, wireless (infra red, radio frequency, cellular telephone, satellite link), fiber optic, etc.

Some channels may require a signal conversion. For example, a fiber optic channel requires converting an electrical signal into an optical signal and back again. A transmitter 780 and a receiver 782 is provided for this purpose. The transmitter 780 converts the speed signal into an optical signal, for example, suitable for a fiber optic channel, while the receiver 782 converts the optical signal back into an electrical signal. Likewise the speed signal can be of a variety of formats. The speed signal can be de, voltage, current, modulated (amplitude, frequency, etc.), etc. In addition, a feedback wire 777 from the speed sensor 103 (FIG. 29) can be provided so as to insure that the drive output is rotating at the desired speed. The feedback wire 777 is coupled to an input of a comparator 771. The other input 775 into the comparator 771 is from the transducer or other device that provides the desired speed input. The output of the comparator 771 is connected to the input of a variable power output stage 773. This stage 773 amplifies the output signal of the comparator 771 to a level that is usable by the coil 17. The power output stage 773 can be a transistor, a silicon-controlled rectifier, a triac, etc. The output of the power output stage 773 is connected the coil 17 by way of the wires 753.

The installation of drive 711 of FIG. 29 will now be described. The hub 13 is mounted onto the motor shaft 31 and secured thereto. Then, the bracket 25 is anchored to prevent rotation. The load is coupled to the drive by installing belts into the sheaves 21. Finally, if an exterior speed input signal is to be provided, then this is connected to the controller 715 by way of wires 775. No external power supply connections are needed to energize the coil. This is because the power supply itself is contained within the drive 711.

The installation of the drive 761 of FIG. 32 is similar to the installation of the drive 711 of FIG. 29, with the exception that the output shaft 763 is coupled to the load.

Although the drive has been described as a shaft mounted unit, that is the drive is mounted and supported by the motor shaft 31, the drive of the present invention could be floor mounted, cabinet mounted, or otherwise mounted and supported by structure other than the motor shaft.

Figure 33:
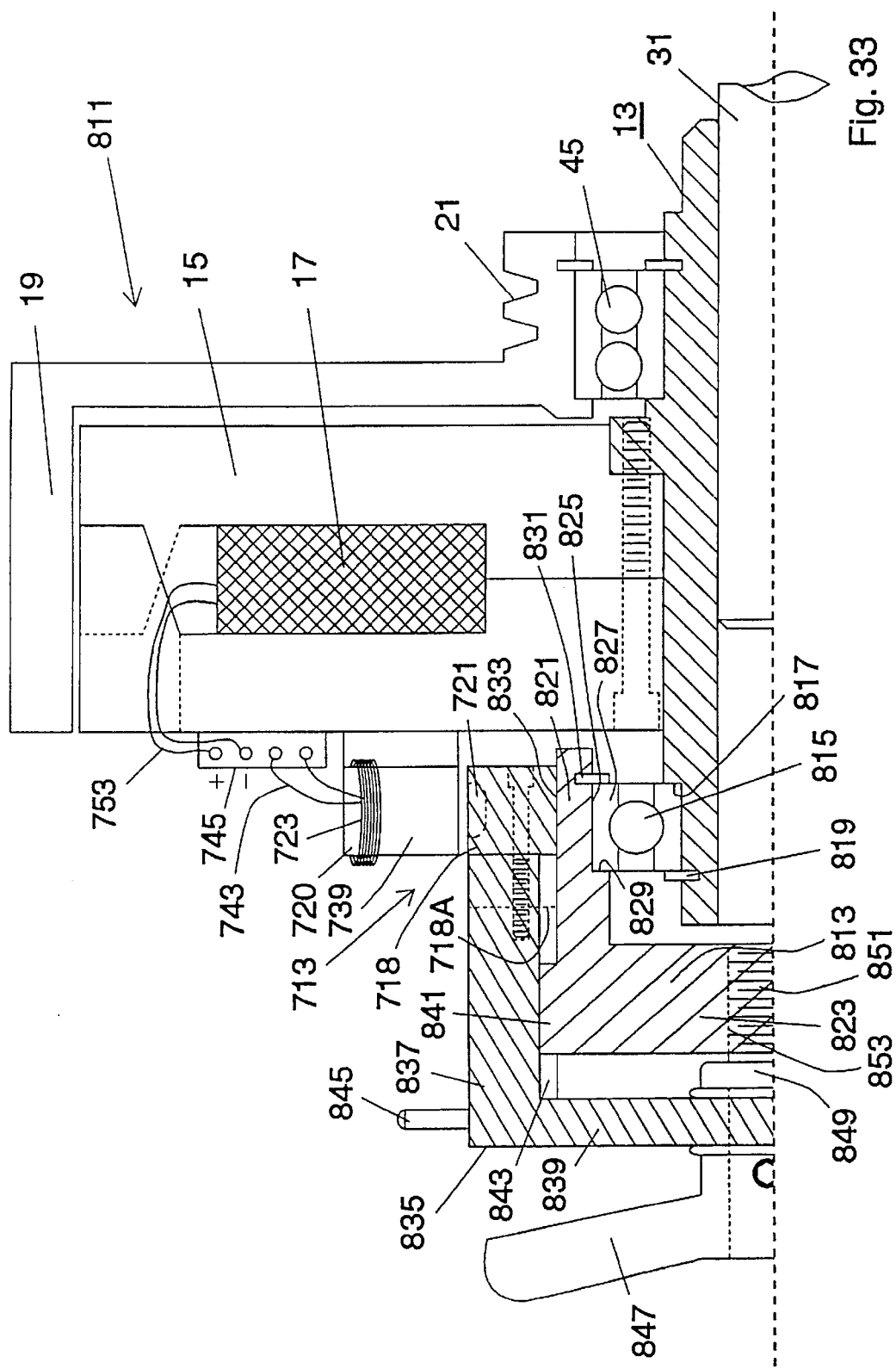
FIG. 33 is a schematic cross-sectional view of a portion of the self-contained drive, in accordance with still another embodiment.

In FIG. 33, there are shown a drive 811 having a self-contained power supply, in accordance with another embodiment. In this drive 811, the speed of the output member (the sheaves 21 in FIG. 33) is regulated by a mechanically manipulating the components of the generator 713. Specifically, the position of the magnetic field with respect to the coil windings 723 is changed so as to expose the coil windings 723 to more or less of the magnetic field.

Describing the drive 811 more particularly, the drive has a hub 13 with inner and outer ends. The inner end receives the motor shaft 31. The pole pieces 15 are mounted to the hub 13.

Mounted to the pole pieces 15 is the rotor 720. The rotor 720 of FIG. 33 is similar to the stator 719 of FIG. 29 in that the rotor 720 has coil windings 723 and poles 739. The rotor 720 is bolted to the outermost pole piece. Wires 743 connect the coil windings 723 to an input of a bridge rectifier 745. The rectifier 745 is mounted to the outermost pole piece 15. The output of the bridge rectifier 745 is connected by wires 753 to the electromagnet coil 17. The drive 811 is an example of a configuration where a rotary coupling to provide elecrtical current between the windings 723 and the coil 17 is not needed. This is because the windings 723 rotate in unison with the coil 17.

A support member 813 is mounted to the outer end of the hub 13, by way of a bearing 815. The bearing 815 is prevented from moving axially on the hub 13 by a shoulder 817 on the hub and a snap ring 819 located in a groove on the hub. The support member 813 has an annular portion 821 and an end portion 823. The annular portion 821 has inside diameter 825 that bears on the outer raceway 827 of the bearing 815. The support member 813 is prevented from moving axially with respect to the bearing 815 by a shoulder 829 on the support member 813 and a snap ring 831 located in a groove on the support member. The end portion 823 of the support member is located outwardly from the bearing 815 (relative the motor shaft 31). In the embodiment shown FIG. 33, the end portion 823 extends across the outermost end of the hub 13.

The annular portion 821 of the support member 813 has a cylindrical outside surface 833. Located on this outside surface is a stator 718 containing permanent magnets 721. The stator 718 is shown and described in FIGS. 29 and 30. The stator 718 is bolted to an adjustment member 835. The adjustment member 835 is cup shaped, having an annular portion 837 and a plate portion 839. The stator 718 is coupled to an inside end (with respect to the motor) of the annular portion 837.

Both the stator 718 and the annular portion 837 of the adjustment member 835 are directly supported by the support member 813. The support member 813 and the adjustment member 835 are coupled by a key 841 and keyway 843. An anchoring pin 845 couples the adjustment member 835 to a stationary point. Thus, the adjustment member 835 and the stator 718, as well the support member 813, are stationary with respect to the hub 13 and the coil 17.

The stator 718 can move with respect to the rotor 720 so as to present more or less of the magnetic field to the rotor. In the preferred embodiment, the stator 718 moves axially with respect to the motor shaft 31. The stator 718 slides along the outside surface 833 of the support member 813 so as to move closer to or further from the pole pieces 15. Movement of the stator 718 is accomplished by turning an adjustment handle 847. The adjustment handle 847 is mounted to a shaft 849 that is received by an opening in the end plate 839 of the adjustment member 835. The shaft 849 rotates freely within the end plate 839, but is coupled by a shoulder and a snap ring to the end plate so as to move in unison with the end plate 839 in an axial direction. The end 851 of the shaft 849 is threaded and is received by a threaded borehole 853 in the end portion 823 of the support member 813.

In FIG. 33, the stator 718 is shown in its optimum alignment with the rotor 720, wherein the coil windings 723 of the rotor 720 cut through the maximum magnetic flux that is provided by the stator. To adjust the position of the stator 718 relative to the rotor 720, the handle 847 is rotated in one direction. This causes the end plate 839 of the adjustment member 835 to be pulled away from the end portion 823 of the support member 813 and the annular portion 837 of the adjustment member 835 to slide along the annular portion 821 of the support member 813. Likewise, the stator 718 slides along the outside surface 833 so as to move away from the pole pieces 15 and out of radial alignment with the rotor 720. The new position of the rotor 718A is shown in dashed lines in FIG. 33. Consequently, the coil windings 723 of the rotor 720 cut through a smaller mount of magnetic flux. This therefore reduces the mount current generated in the coil windings 723 and ultimately provided to the electromagnet coil 17. Thus, the speed of the sheaves 21 is reduced.

To increase the speed of the sheaves 21, the adjustment handle 847 is rotated in the opposite direction to slide the stator 718 along the outside surface 833 so as to be closer to the pole pieces 15 and into a more radial alignment with rotor 720.

The adjustment handle 847 is frictionally mounted to the adjustment member 835, so that once the stator is set in the desired position, the handle will not rotate on its own. A lock can be added to the adjustment handle to secure its position and ensure that the stator stays in the desired location with respect to the rotor.

The regulator device 718, 720, 813, 835 of FIG. 33 can also be used on a shaft-in shaft-out drive such as is shown and described in FIG. 32. Instead of having the adjustment and support members covering the outer end of the hub, these members would be made annular so as allow the insertion of a shaft therethrough.

Although the various drives discussed above have been described with a rigid conduit 93 for preventing rotation of the stationary wires, the wires themselves can perform this function if they are sufficiently stiff. Alternatively, a flexible cable or conduit can be used.

Although the drives of present invention has been described as using Lundberg type of pole pieces, other types of magnetic poles could be used. For example, salient type poles could be used without departing from the spirit and scope of the present invention.

The foregoing disclosure and the showings made in the drawings are merely illustrative of the principles of this invention and are not to be interpreted in a limiting sense.

We claim:

1. A variable speed drive, comprising:
    a first rotatable member that comprises pole pieces and a drive coil;
    a second rotatable member that comprises an armature;
    one of said first rotatable member or said second rotatable member comprising a hub that is structured and arranged to be rotated by a motor, the other of said first rotatable member or said second rotatable member being structured and arranged to be coupled to a load;
    said pole pieces having plural interdigitated poles, said poles being separated from said armature by a gap;
    said drive coil located adjacent to said pole pieces, said pole pieces providing a path for a magnetic field produced by said drive coil;
    an electrical conductor that is stationary relative to said drive coil;
    a bearing having first and second electrically conductive portions, said first portion being coupled with said drive coil so as to rotate in unison with said drive coil, said first portion being electrically connected to said drive coil, said second portion being coupled to said stationary conductor and being electrically connected to said stationary conductor, said first portion rotating with respect to said second portion, said bearing having a conductive lubricant that is in contact with both of said first and second portions.

2. A variable speed drive for use with a motor, said motor having a motor shaft, comprising:
    a) an electromagnet having a coil;
    b) an armature located close to the electromagnet, with one of the electromagnet or the armature being structured and arranged so as to be coupled with the motor shaft so as to rotate in unison with the motor shaft and the other of the electromagnet or the armature being structured and arranged so as to rotate independently of the motor shaft and being directly coupled to a load portion;

c) a generator having a rotor and a stator, with the rotor being structured and arranged so as to be coupled with the motor shaft and stator being structured and arranged so as to be coupled to a nonrotating point relative to the motor shaft, with one of the rotor or the stator producing a magnetic field and the other of the rotor or the stator having a winding that is located within the magnetic field, the other of the rotor or the stator that has the winding having an electrical output that is electrically coupled to the electromagnet;

d) an energy regulator for regulating the mount of current that is applied to the coil, the energy regulator being electrically connected to the coil and to the winding.

3. The variable speed drive of claim 2, further comprising:

a) the generator is an ac generator;

b) a rectifier having an input that is coupled to the electrical output of the generator, the rectifier having an output that is coupled to an input of the regulator.

4. The variable speed drive of claim 2, wherein the one of the rotor or the stator providing a magnetic field comprises permanent magnets.

5. The variable speed drive of claim 2, wherein the winding is located on the rotor.

6. The variable speed drive of claim 2 wherein the winding is located on the stator, the drive further comprising an electrical rotary coupling connected between the winding and the coil.

7. The variable speed drive of claim 6 wherein the electrical rotary coupling comprises a liquid coupling.

8. The variable speed drive of claim 6, wherein the electrical rotary coupling comprises bearings.

9. The variable speed drive of claim 2 wherein the regulator comprises a power input and a speed input which provides a variable speed signal to the regulator.

10. The variable speed drive of claim 9, wherein the speed signal is provided to the speed input of the regulator by a wireless channel.

11. The variable speed drive of claim 9 wherein the speed signal is provided to the speed input of the regulator by a fiber optic channel.

12. The variable speed drive of claim 9, wherein the regulator further comprises:

a) a feedback input that is connected to a speed sensor, wherein the speed sensor is located adjacent to the other of the electromagnet or the armature that is directly coupled to the load portion;

b) a comparator having first and second inputs, with the first input connected to the speed input and the second input connected to the feedback input.

13. A variable speed drive for use with a motor, said motor having a motor shaft, comprising:

a) an electromagnet having a coil;

b) an armature located close to the electromagnet, with one of the electromagnet or the armature being structured and arranged so as to be coupled with the motor shaft so as to rotate in unison with the motor shaft and the other of the electromagnet or the armature being structured and arranged so as to rotate independently of the motor shaft and being directly coupled to a load portion;

c) a generator having a rotor and a stator, with the rotor being structured and arranged so as to be coupled with the motor shaft and the stator being structured and arranged so as to be coupled to a nonrotating point relative to the motor shaft, with one of the rotor or the stator producing a magnetic field and the other of the rotor or the stator having a winding that is located within the magnetic field, the other of the rotor or the stator that has the winding having an electrical output;

d) an energy regulator that comprises means for moving either one of the stator or the rotor with respect to the other of the stator or the rotor so as to vary the amount of the magnetic field that is provided to the winding.

14. A method of operating a variable speed drive, the drive comprises a first rotatable member with an electromagnet and a second rotatable member with an armature that is located close to the electromagnet, one of either the first rotatable member or the second rotatable member being coupled with a motor shaft, the other of the first rotatable member or the second rotatable member being coupled to a load portion, comprising the steps of:

a) rotating the one of the first rotatable member or the second rotatable member that is coupled to the motor shaft by the motor;

b) generating electrical energy from the rotation of the one of the first rotatable member or the second rotatable member that is coupled to the motor shaft;

c) providing the generated electrical energy to the electromagnet.

15. The method of claim 14 further comprising the step of regulating the amount of the generated electrical energy that is provided to the electromagnet so as to vary an output speed of the load portion.

16. The method of claim 14, further comprising the steps of:

a) providing a rotor that is coupled to the one of the first rotatable member or the second rotatable member that is rotated by the motor and providing adjacent to the rotor a stator that is coupled to the other of the first rotatable member or the second rotatable member, wherein one of either the rotor or the stator creates a magnetic field and the other of either the rotor or the stator having a winding that is electrically coupled to the electromagnet and that is exposed to the magnetic field;

b) the step of generating electrical energy further comprising the step of rotating the rotor.

17. The method of claim 16 further comprising the step of regulating the mount of the generated electrical energy that is provided to the electromagnet so as to vary an output speed of the load portion.

18. The method of claim 17 wherein the step of regulating the amount of the generated electrical energy that is provided to the electromagnet further comprises the step of varying the amount of the magnetic field that is provided to the winding.

19. A variable speed drive, comprising:

a) a first rotatable member that comprises a hub that is structured and arranged to be mounted on a motor shaft;

b) a second rotatable member that comprises a load portion, the second rotatable member being rotatably coupled to the first rotatable member;

c) an electromagnet and an armature, with one of the electromagnet or the armature being coupled to the first rotatable member so as to rotate with the hub and the other of the electromagnet or the armature being coupled to the second rotatable member so as to rotate with the load portion, the electromagnet being separated from the armature by a gap;

d) a permanent magnet located adjacent to a winding, the winding being electrically coupled to the electromagnet, with one of the magnet or the winding being coupled to the first rotatable member so as to rotate with the hub;

e) a support member rotatably coupled to one of the first rotatable member or the second rotatable member, the support member being held stationary by an anchor;

f) the other of the magnet or the winding being coupled to the support member.

20. The variable speed drive of claim 19 wherein:

a) the hub has first and second ends, with the hub first end being structured and arranged to be mounted on the motor shaft;

b) the magnet, the winding, and the support being located adjacent to the hub second end.

21. The variable speed drive of claim 19 wherein the support member is rotatably coupled to one of the first rotatable member or the second rotatable member by bearings.

22. The variable speed drive of claim 19 further comprising a motor, the motor rotating the motor shaft, the motor comprising an internal combustion engine.

* * * * *